United States Patent
Miuchi et al.

(10) Patent No.: US 9,701,199 B2
(45) Date of Patent: Jul. 11, 2017

(54) DISPLAY CONTROL DEVICE FOR VEHICLE AND DISPLAY CONTROL METHOD FOR VEHICLE

(71) Applicant: NISSAN MOTOR CO., LTD., Yokohama-shi, Kanagawa (JP)

(72) Inventors: Yosuke Miuchi, Sagamihara (JP); Naoki Miyashita, Yokohama (JP); Tomoyuki Kashiwaya, Ebina (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/760,405

(22) PCT Filed: Dec. 27, 2013

(86) PCT No.: PCT/JP2013/007703
§ 371 (c)(1),
(2) Date: Jul. 10, 2015

(87) PCT Pub. No.: WO2014/108987
PCT Pub. Date: Jul. 17, 2014

(65) Prior Publication Data
US 2015/0352956 A1 Dec. 10, 2015

(30) Foreign Application Priority Data
Jan. 11, 2013 (JP) .................................. 2013-003631

(51) Int. Cl.
*A01B 69/00* (2006.01)
*B62D 6/00* (2006.01)
(Continued)

(52) U.S. Cl.
CPC .............. *B60K 35/00* (2013.01); *B60K 37/02* (2013.01); *B60W 40/10* (2013.01);
(Continued)

(58) Field of Classification Search
CPC ....... G06T 2201/0065; G06T 2201/005; G06T 2207/10004; G06T 2207/10024;
(Continued)

(56) References Cited

U.S. PATENT DOCUMENTS 6,352,318 B1    3/2002  Hosomi et al.
6,785,404 B1 *  8/2004  Shimazaki ............. H04N 7/183
                                                          340/907

(Continued)

FOREIGN PATENT DOCUMENTS

CN    102056772 A    5/2011
JP    2000-344085 A  12/2000
(Continued)

*Primary Examiner* — Jelani Smith
*Assistant Examiner* — Luis A Martinez Borrero
(74) *Attorney, Agent, or Firm* — Young Basile Hanlon & MacFarlane, P.C.

(57) ABSTRACT

Information display is performed, in which recognizability of information regarding a driving support control is relatively good even in a situation where a driving load is relatively large, the information display not annoying a driver. A display controller displays a support state displaying image, which is an image having a configuration in which a vehicle image is superimposed on a mesh image as a mesh-like planar image, on a liquid crystal display device provided in a meter panel of a meter device. In addition, upon having determined that a driving support control implemented by a driving support device is operating, the display controller performs a display control to change a display mode of a mesh image portion of the support state displaying image, which is to be displayed on the liquid crystal display device, to a preset display mode.

10 Claims, 18 Drawing Sheets

(51) Int. Cl.
*B62D 11/00* (2006.01)
*B62D 12/00* (2006.01)
*B63G 8/20* (2006.01)
*G05D 1/00* (2006.01)
*G06F 17/00* (2006.01)
*B60K 35/00* (2006.01)
*B62D 15/02* (2006.01)
*B60W 40/10* (2012.01)
*G09G 5/02* (2006.01)
*G09G 5/36* (2006.01)
*B60K 37/02* (2006.01)
*B60W 30/02* (2012.01)
*B60W 30/14* (2006.01)
*B60W 50/14* (2012.01)

(52) U.S. Cl.
CPC .......... *B62D 15/0295* (2013.01); *G09G 5/02* (2013.01); *G09G 5/36* (2013.01); *B60K 2350/1064* (2013.01); *B60K 2350/352* (2013.01); *B60K 2350/92* (2013.01); *B60W 30/02* (2013.01); *B60W 30/143* (2013.01); *B60W 2050/146* (2013.01); *G09G 2380/10* (2013.01)

(58) Field of Classification Search
CPC .... G06T 2207/30084; B60K 2350/352; B60K 2350/92; B60K 35/00; B60K 37/02; B62D 15/0295; B62D 15/0275; B62D 15/028; B62D 15/027; G09G 2360/144; G09G 3/3233; G09G 2300/0426; G09G 2380/02; B60W 2720/10; B60W 2540/04; B60W 10/184; B60W 2720/30
USPC .... 701/96, 36, 38, 41, 45, 48, 93, 408, 470, 701/300, 301, 469; 345/594, 173, 419, 345/441, 633, 632, 30, 420
See application file for complete search history.

(56) References Cited

U.S. PATENT DOCUMENTS

| | | | | |
|---|---|---|---|---|
| 7,683,771 B1* | 3/2010 | Loeb | ...................... | B60K 35/00 340/438 |
| 7,954,951 B2* | 6/2011 | Kuno | ...................... | B60K 35/00 340/441 |
| 8,045,003 B2* | 10/2011 | Nohno | ...................... | B60K 37/02 345/1.1 |
| 8,103,410 B2* | 1/2012 | Hatano | ...................... | B60K 35/00 180/400 |
| 8,598,999 B2* | 12/2013 | Tuzar | ...................... | B60K 37/02 116/284 |
| 8,633,811 B2* | 1/2014 | Ikeda | ...................... | B60Q 9/005 340/441 |
| 2003/0080877 A1* | 5/2003 | Takagi | ...................... | B60R 1/00 340/932.2 |
| 2005/0280514 A1* | 12/2005 | Doan | ...................... | B60K 35/00 340/425.5 |
| 2006/0287826 A1* | 12/2006 | Shimizu | ...................... | B60K 35/00 701/431 |
| 2007/0182537 A1* | 8/2007 | Abe | ...................... | G01P 1/08 340/462 |
| 2008/0215223 A1* | 9/2008 | Yamada | ...................... | B60T 8/1755 701/81 |
| 2009/0112389 A1* | 4/2009 | Yamamoto | ......... | B60C 23/0401 701/31.4 |
| 2009/0261957 A1* | 10/2009 | Kido | ...................... | B60K 35/00 340/435 |
| 2010/0164702 A1* | 7/2010 | Sasaki | ...................... | G01B 21/22 340/438 |
| 2010/0289634 A1* | 11/2010 | Ikeda | ...................... | B60Q 9/005 340/441 |
| 2010/0302018 A1* | 12/2010 | Tuzar | ...................... | B60K 37/02 340/425.5 |
| 2010/0321176 A1* | 12/2010 | Hofmann | ............... | B60K 35/00 340/438 |
| 2011/0069169 A1* | 3/2011 | Kadowaki | ................ | B60R 1/00 348/148 |
| 2011/0087415 A1* | 4/2011 | Yokoyama | ............... | B60T 7/22 701/71 |
| 2011/0090074 A1* | 4/2011 | Kuno | ...................... | B60K 35/00 340/438 |
| 2012/0072097 A1 | 3/2012 | Ohta et al. | | |
| 2012/0218295 A1* | 8/2012 | Hashikawa | ............ | B60K 35/00 345/629 |
| 2014/0277943 A1* | 9/2014 | Lee | ...................... | B60W 30/06 701/41 |
| 2015/0203035 A1* | 7/2015 | Watanabe | .......... | B62D 15/0295 382/103 |
| 2016/0042238 A1* | 2/2016 | Lynam | ................... | B60Q 9/005 701/45 |

FOREIGN PATENT DOCUMENTS

| | | |
|---|---|---|
| JP | 2011-001049 A | 1/2011 |
| JP | 2011-002290 A | 1/2011 |
| JP | 2012-216135 A | 11/2012 |

\* cited by examiner

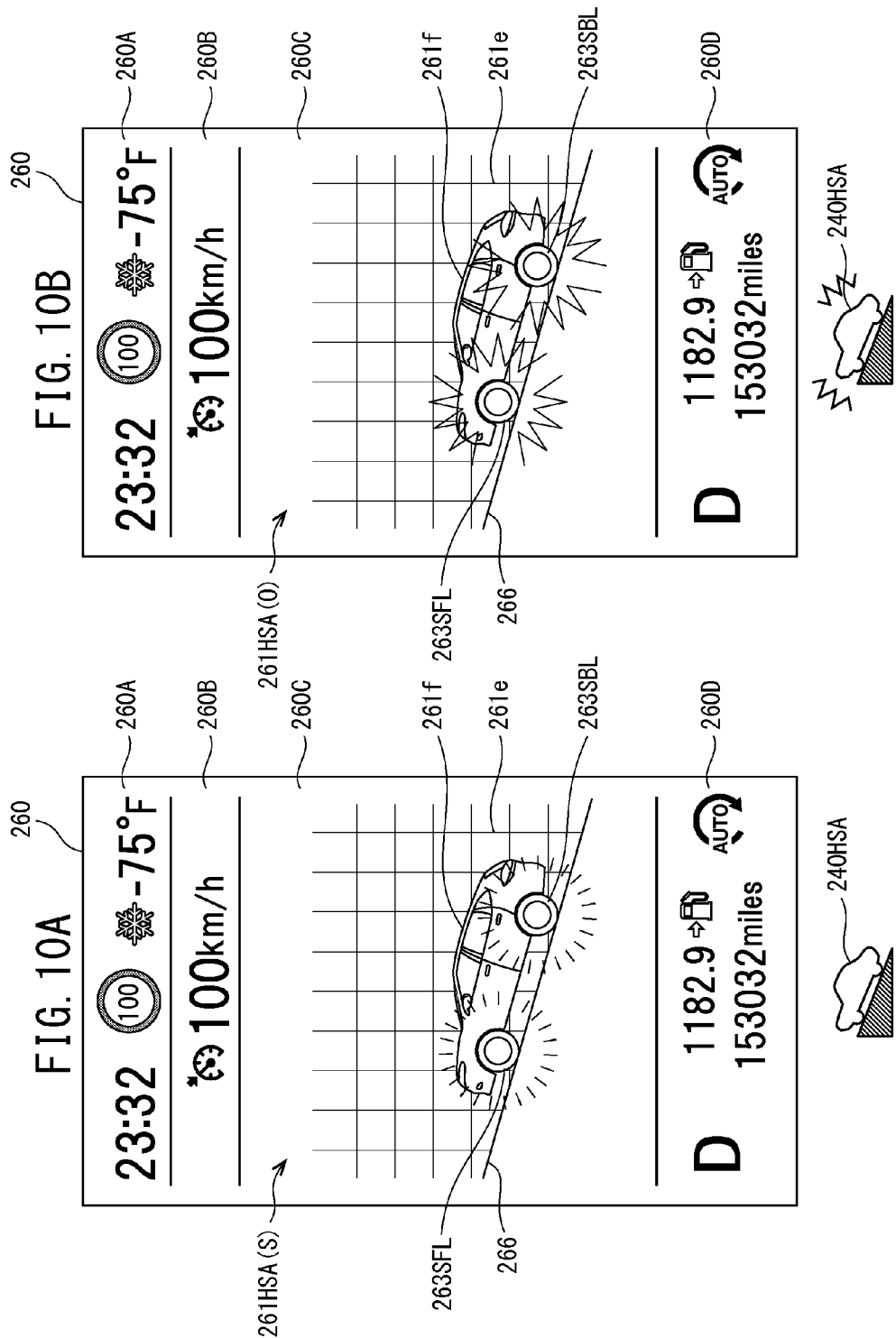

FIG. 17

DISPLAY CONTROL DEVICE FOR VEHICLE AND DISPLAY CONTROL METHOD FOR VEHICLE

CROSS REFERENCE TO RELATED APPLICATION

The entire contents of Japanese Patent Application 2013-003631 (filed on Jan. 11, 2013), on which this application claims priority, are incorporated herein by reference.

TECHNICAL FIELD

The present invention relates to a display control device for a vehicle and a display control method for a vehicle, which perform a display control of operation state information of a vehicle driving support control for a display device provided in a meter panel of an automotive meter device.

BACKGROUND

Heretofore, as a technology for displaying information of a vehicle braking/driving control for a display device provided in a meter panel of an automotive meter device, there is a technology disclosed in JP 2000-344085 A. A wheel control state display device of JP 2000-344085 A includes braking/driving force control means for detecting a vehicle state and adjusting braking force or driving force for a plurality of wheels, which are attached onto a vehicle, based on a result of such detection. Then, the wheel control state display device displays the wheels, in which the braking force or the driving force is adjusted by the braking/driving force control means, by an indicator placed on an instrument panel.

However, in JP 2000-344085 A, the information is displayed by controlling lighting of four lamps of the indicator, wherein the four lamps individually correspond to wheel positions on a vehicle contour portion simulating a shape of the vehicle, and the indicator is composed of the vehicle contour portion and the four lamps. That is to say, by the lighting or blinking of the lamp at the position concerned, a driver is notified of the wheel in which the braking force or the driving force is adjusted. Hence, in order to recognize the wheel in which the braking force or the driving force is adjusted, it is necessary for the driver to visually recognize at which tire position the lamp is lighted. Therefore, for example, in a situation such as a travel on a curved road, where a driving load is high, it is apprehended that recognizability of the display information may be deteriorated. Moreover, in the situation where the driving load is high, it is apprehended that the display itself of such detailed information as the lighting of the lamp at the spot concerned may seem to annoy the driver.

SUMMARY

The present invention has aimed at such a point as described above. It is an object of the present invention to perform information display, in which the recognizability of the information regarding a driving support control is relatively good even in the situation where the driving load is relatively large, the information display not annoying the driver.

In order to solve the above-described problems, an embodiment of the present invention displays a support state displaying image, which is an image having a configuration in which a vehicle image is superimposed on a background image as a planar image with a predetermined shape, on a display device provided in a meter panel of an automotive meter device. In addition, when it is determined that a driving support control implemented by an automotive driving support device is activated, a display control to change a display mode of portion of the background image of the support state displaying image, which is to be displayed on the display device, to a preset display mode is performed.

In accordance with the present invention, the display mode of the portion of the background image is changed, whereby the driver is notified that the driving support device is operating. That is to say, a display mode of not a minute part portions corresponding to the control of the vehicle image portion but an image of the background portion is changed. Hence, it becomes possible for the driver to grasp a change of a display content by an instantaneous movement of a line of sight and by a peripheral visual field without gazing the display content. In such a way, even in a situation where the driving load is high, it becomes possible to accurately notify the driver that the driving support control is operating without annoying the driver.

BRIEF DESCRIPTION OF THE DRAWINGS

FIGS. 10A and 10B are views showing examples of rendering images 261HSA as support state displaying images for HSA;

FIG. 17 is a view showing an example of progresses of a display content of a display screen 260 and a lighting state of an indicator lamp 240HSA for HSA with respect to progresses of a traveling state of the automobile V and a pedal operation state of the driver in the operation scene of the driving support control HSA;

DETAILED DESCRIPTION OF THE EMBODIMENTS

First Embodiment

A description is made below of a first embodiment of the present invention based on the drawings. FIG. 1 to FIG. 17 are views showing an embodiment of a display control device for a vehicle and a display control method for a vehicle according to the first embodiment of the present invention.

(Configuration)

Figure 1:
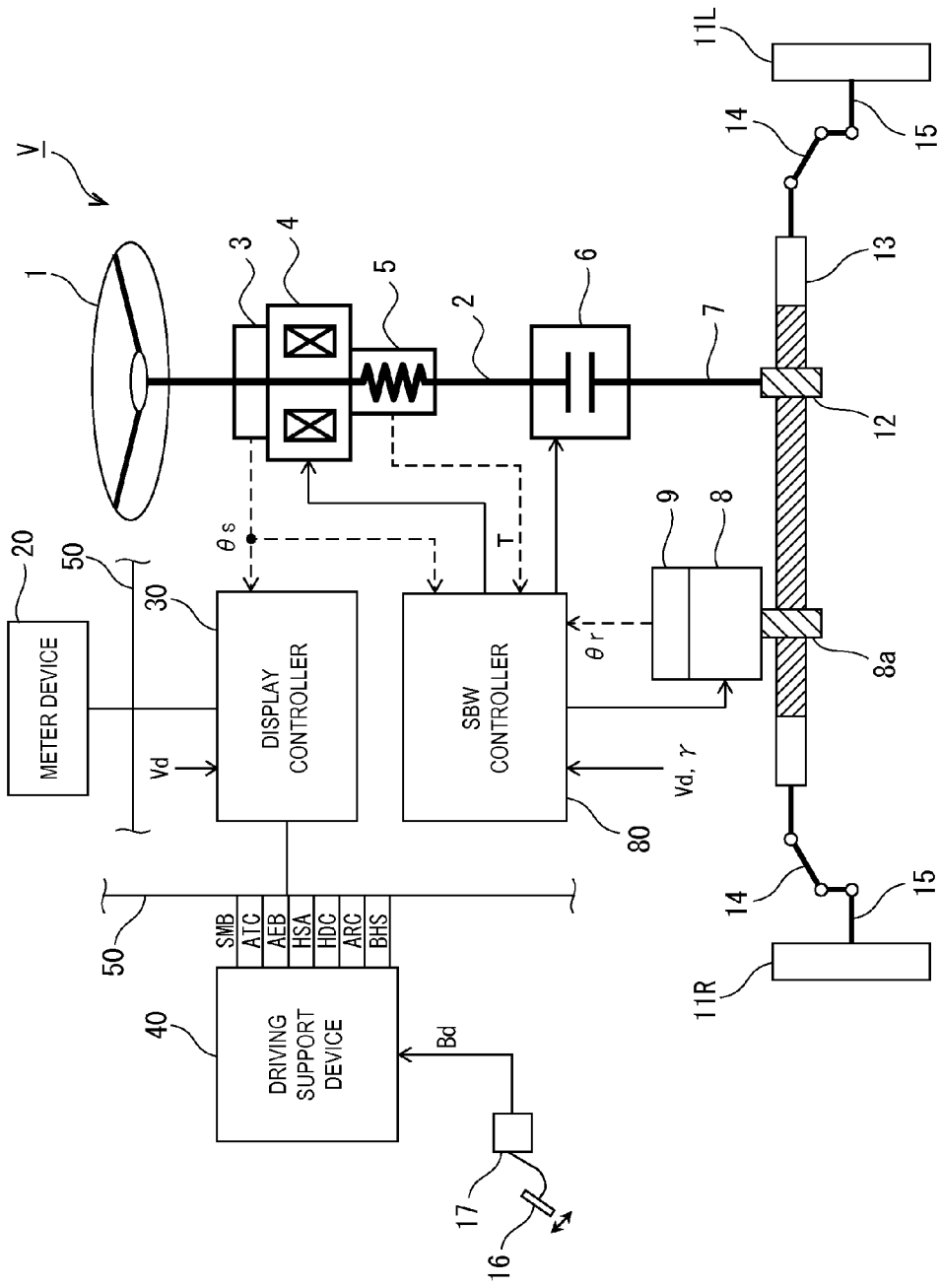
FIG. 1 is a conceptual diagram showing a model of an automobile V to which a display control device for a vehicle according to a first embodiment is applied.

FIG. 1 is a conceptual diagram showing a model of an automobile V to which a display control device for a vehicle according to this embodiment is applied. The automobile V of this embodiment mounts a SBW (steer-by-wire) system thereon. As shown in FIG. 1, this automobile V includes: a steering wheel 1 steerable by a driver; right-and-left front wheels (steered wheels) 11R and 11L; and a steering shaft 2.

The steering wheel 1 is provided so as to be mechanically separatable from the right-and-left front wheels 11R and 11L. The steering wheel 1 is coupled to the steering shaft 2. The automobile V further includes: a steering angle sensor 3; a reaction motor 4; and a steering torque sensor 5. The steering angle sensor 3, the reaction motor 4 and the steering torque sensor 5 are provided on the steering shaft 2.

The steering angle sensor 3 is a sensor that detects a steering angle θs of the steering wheel 1, and is composed of an encoder and the like.

The reaction motor 4 is a motor that gives steering reaction force to the steering wheel 1 by adding torque to the steering shaft 2. Here, the above-described steering reaction force is reaction force that acts in an opposite direction to an operation direction where the driver steers the steering wheel 1. This reaction motor 4 is composed of a brushless motor or the like, and drives in response to a reaction motor drive current outputted by a SBW controller 80 to be described later.

The steering torque sensor 5 detects steering torque T transmitted from the steering wheel 1 to the steering shaft 2. This steering torque sensor 5 is configured to detect the steering torque T by detecting a torsion angle displacement of a torsion bar by using a potentiometer.

The automobile V further includes: a clutch 6; a pinion shaft 7; a steering motor 8; a steering motor angle sensor 9; a pinion gear 12; a rack shaft 13; tie rods 14; steering knuckle arms 15; and the SBW controller 80.

The clutch 6 is interposed between the steering wheel 1 and the steered wheels 11R and 11L, and is switched to a release state or an engagement state in accordance with a clutch instruction (clutch instruction current) from the SBW controller 80.

In a usual state, this clutch 6 is in the release state, and turns to the engagement state when some abnormality (for example, abnormality in a steering reaction force system) occurs in the SBW system. In a state where the abnormality concerned occurs and the clutch 6 is engaged, a steering support control to give the steering system steering support force for reducing a steering load of the driver (hereinafter, this steering support control is referred to as an EPS control) is performed.

Moreover, this clutch 6 turns to the engagement state also in an end abutment state where the driver steers the steering wheel 1 to a vicinity of a steering limit. In the state where the clutch 6 is engaged as a result of turning to the end abutment state, an end abutment-time control for giving the driver an end abutment feeling is performed.

In the release state of the clutch 6, a torque transmission path between the steering wheel 1 and the steered wheels 11R and 11L is mechanically disconnected, and accordingly, a state is brought, where a steering operation of the steering wheel 1 is not transmitted to the steered wheels 11R and 11L. Meanwhile, in the engagement state of the clutch 6, the torque transmission path between the steering wheel 1 and the steered wheels 11R and 11L is mechanically connected, and accordingly, a state is brought, where the steering operation of the steering wheel 1 is transmitted to the steered wheels 11R and 11L.

With regard to the pinion shaft 7, one end thereof is coupled to the clutch 6, and the pinion gear 12 is provided on other end thereof. The pinion gear 12 meshes with a rack gear provided between both end portions of the rack shaft 13.

Both ends of the rack shaft 13 are coupled to the steered wheels 11R and 11L individually through the tie rods 14 and the steering knuckle arms 15. That is to say, the rack shaft 13 is displaced in a vehicle width direction in response to a rotation of the pinion gear 12, whereby the steered wheels 11R and 11L are steered through the tie rods 14 and the steering knuckle arms 15, and are made capable of changing a travel direction of the automobile V.

Moreover, the steering motor 8 is composed of a brushless motor or the like in a similar way to the reaction motor 4, and drives in response to a steering motor drive current outputted by the SBW controller 80. This steering motor 8 drives in response to the steering motor drive current, and thereby outputs the steering torque for steering the steered wheels 11R and 11L.

On a tip end side of an output shaft of the steering motor 8, a steering output gear 8a formed by using the pinion gear 12 is provided. Then, the steering output gear 8a meshes with a rack gear provided between both end portions of the rack shaft 13. That is to say, the steered wheels 11R and 11L are made steerable in response to a rotation of the steering output gear 8a.

Moreover, the steering motor angle sensor 9 is provided on the steering motor 8. The steering motor angle sensor 9 detects a rotation angle of the steering motor 8. A steering angle θr of the steered wheels 11R and 11L is uniquely determined by a rotation angle of the steering output gear 8a and by a gear ratio of the rack gear of the rack shaft 13 and the steering output gear 8a. Therefore, in this embodiment, the steering angle θr of the steered wheels 11R and 11L from the rotation angle of the steering motor 8.

The SBW controller 80 receives the steering angle θs of the steering wheel 1, which is detected by the steering angle sensor 3, the steering torque T detected by the steering torque sensor 5, and the steering angle θr detected by the steering motor angle sensor 9. Moreover, besides the above, the SBW controller 80 receives a vehicle velocity Vd and a yaw rate y from a controller (not shown) of other system.

Then, in the release state of the clutch 6, the SBW controller 80 controls a drive of the steering motor 8 in response to a steering state of the steering wheel 1, and steers the steered wheels 11R and 11L. In such a way, the steering angle θr of the steered wheels 11R and 11L coincides with a steering instruction angle corresponding to the steering state. Moreover, at the same time, the SBW controller 80 controls a drive of the reaction motor 4 in response to the steering state of the steered wheels 11R and 11L, and imparts the steering reaction force to the steering wheel 1. In such a way, the SBW controller 80 gives steering reaction force, which simulates road surface reaction force, to the steering wheel 1. As described above, the SBW controller 80 performs a steer-by-wire control (hereinafter, referred to as a SBW control).

Moreover, in the state where the clutch 6 is engaged as a result of turning to the end abutment state, the SBW controller 80 performs a steering angle fixing control, which is to fix the steering angle to a predetermined steering angle, as the end abutment-time control for giving the end abutment feeling to the driver. For example, the above-described predetermined steering angle is set to be a rack end angle. The end abutment-time control is ended at timing when the driver performs a steering-back operation for the steering wheel 1. After the end abutment-time control is ended, the SBW controller 80 returns to a usual SBW control.

Furthermore, the automobile V includes: a meter device 20; a display controller 30; a driving support device 40; and a communication network 50. Still further, the automobile V includes: a brake pedal 16 depressible by the driver; and a brake operation detection device 17 that detects a depression amount Bd of the brake pedal 16.

(Driving Support Device 40)

The driving support device 40 includes a plurality of control systems (not shown) which implement a variety of driving support controls. The driving support device 40 controls braking/driving force of the automobile V, controls a gear ratio of a transmission (CVT), controls a SBW system, and thereby implements the variety of driving support controls.

Furthermore, the driving support device 40 generates operation flags, which indicate operation states of the respective driving support controls, and transmits the generated operation flags to the display controller 30 through the communication network 50. Here, the operation flags are set individually for the variety of driving support controls. Then, the respective operation flags are flags, which turn ON (where signals are at a high level) under operation of the driving support controls, and turn OFF (where the signals are at a low level) under non-operation of the driving support controls.

Moreover, in this embodiment, the driving support device 40 implements driving support controls of the following (1) to (6). Note that the driving support controls are not limited to six types of the following (1) to (6), and the driving support device 40 may be configured to implement other driving support controls such as an inter-vehicle distance maintenance control.

(1) ATC (Active Trace Control)
(2) AEB (Active Engine Brake)
(3) ARC (Active Ride Control)
(4) HSA (Hill Start Assist)
(5) HDC (Hill Descent Control)
(6) SMB (Side Magic Bumper)

ATC is a driving support control that controls brake and engine outputs to the respective wheels so as to reduce a delay of the yaw rate of the automobile V to the steering in response to a turning condition of the automobile V, which is detected based on a steering state of the driver and on a plurality of sensor detection values.

AEB is a driving support control that reduces the driving load (pedal retreading operation of the driver) at a time of traveling along a curved road such as a corner by controlling the gear ratio of the transmission to add a deceleration in response to the driving state of the automobile V, which is based on the steering state of the driver and on the plurality of sensor detection values.

ARC is a driving support control that enhances motion convergence of a vehicle body after the automobile V gets over irregularities, each of which serves as a relatively large input thereto.

HSA is a driving support control that holds a pressure of the brake for a few seconds (for example, two seconds) in an event where the automobile V starts on a slope, and thereby prevents the automobile V from rolling backward in an event where the driver retreads from the brake pedal to an accelerator pedal.

HDC is a driving support control that performs the braking/driving control so as to enable the automobile V to go down a down slope, on which the automobile V cannot be decelerated only by an engine brake, and a down slope of such a slippery road surface as a snowy road at a constant vehicle velocity (settable at 4 [km/h] to 15 [km/h]).

SMB is a driving support control that enhances traveling stability of the automobile V with respect to the steering angle thereof. In order to enable the automobile V to trace a travel line accurately with a less steering angle correction, SMB recognizes a lane of a front road by an automotive camera (not shown) placed above a rear-view mirror of the automobile V. Then, when a deviation is detected between a travel direction of the automobile V and the lane, then the SBW system is controlled, whereby a tire angle is corrected so as to reduce the deviation concerned, and the reaction force is given to the steering. For example, even if the travel direction of the vehicle is changed by a cross wind, a rut and the like, SMB can reduce such a change, and accordingly, is capable of suppressing correction steering of the driver.

The driving support device 40 generates the operation flags, which correspond to the respective driving support controls of the above-described (1) to (6), and transmits the respective generated operation flags to the display controller 30 through the communication network 50.

Specifically, as shown in FIG. 1, the driving support device 40 generates an operation flag SMB, which indicates an operation state of SMB, an operation flag ATC, which indicates an operation state of ATC, an operation flag AEB, which indicates an operation state of AEB, an operation flag HSA, which indicates an operation state of HSA, an operation flag HDC, which indicates an operation state of HDC, and an operation flag ARC, which indicates an operation state of ARC. Then, the driving support device 40 transmits the generated operation flags SMB, ATC, AEB, HSA, HDC and ARC to the display controller 30 through the communication network 50.

In this embodiment, the communication network 50 is a network that adopts CAN (Controller Area Network) communication protocol. In the CAN communication protocol, a variety of controllers are connected with a line-type connection configuration, and data communication is performed by bus access of a multi-master system. Note that the communication network 50 is not limited to the CAN communication protocol, and for example, may have a configuration that adopts other communication protocol such as LIN (Local Interconnect Network and FlexRay. Note that, in this embodiment, FlexRay communication protocol is adopted in the SBW system.

The brake operation detection device 17 supplies a brake pedal operation amount, which is detected thereby, to a VDC system (not shown) as one of the control systems provided in the driving support device 40.

Here, the VDC system is a system that implements a braking/driving control (stability control) to sense skids of the front/rear wheels, to control the braking force to the respective wheels and the engine output, and to enhance the stability of the automobile V. In this embodiment, the VDC system generates BHS (Brake Hold State) information, which indicates a driver's depression state of the brake pedal 16, based on the brake pedal operation amount supplied thereto. Then, the VDS system is configured to supply the generated BHS information to the display controller 30 through the communication network 50. Note that the VDC system may be configured to acquire the BHS information from other system.

(Meter Device 20)

Figure 2:
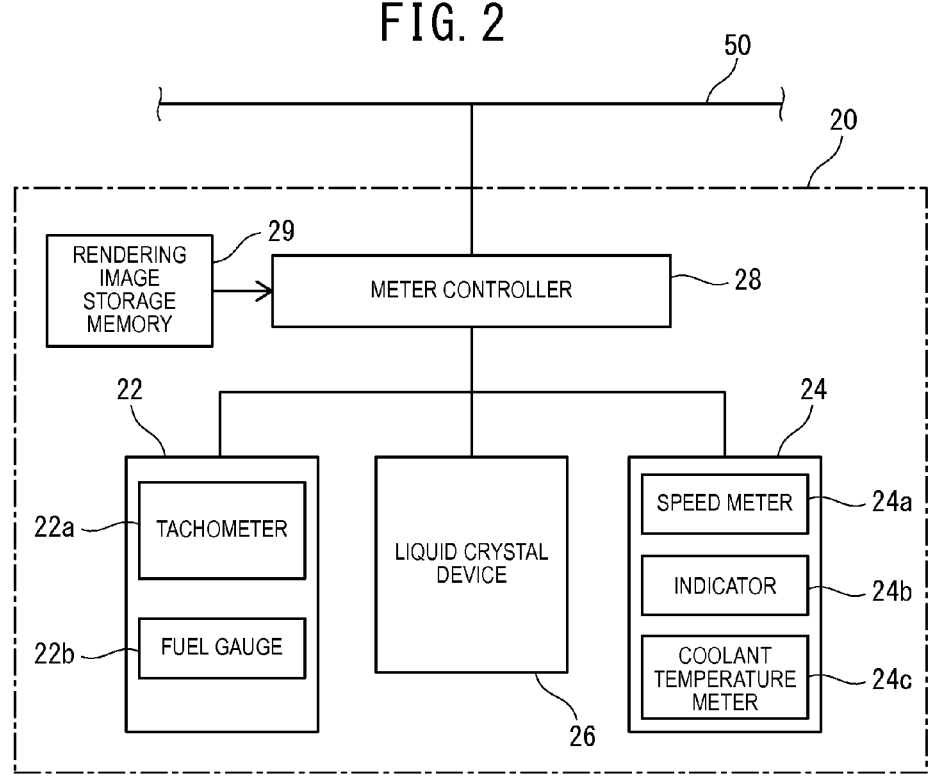
FIG. 2 is a block diagram showing a configuration example of a meter device 20.
Figure 3:
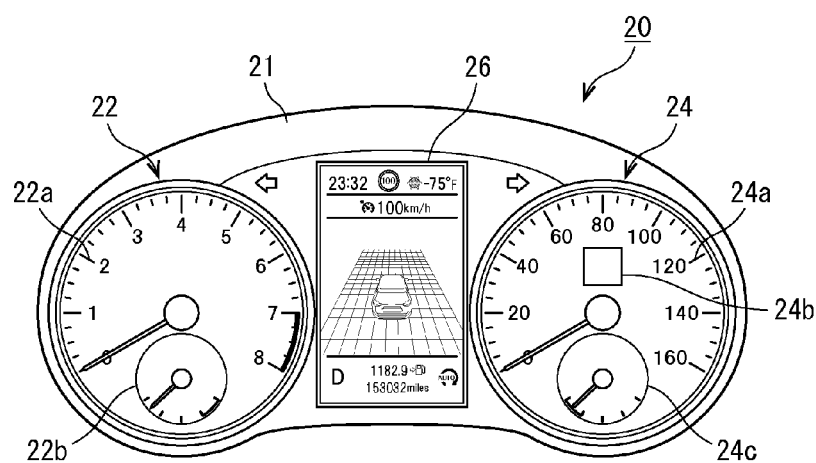
FIG. 3 is a view showing an example of an external configuration of the meter device 20.

Next, a description is made of the meter device 20 based on FIG. 2 and FIG. 3.

FIG. 2 is a block diagram showing a configuration example of the meter device 20. FIG. 3 is a view showing an example of an exterior configuration of the meter device 20. As shown in FIG. 2, the meter device 20 includes: a first meter 22; a second meter 24; a liquid crystal display device 26; a meter controller 28; and a rendering image storage memory 29.

The first meter 22 has a configuration including: a tachometer 22a that meter-displays an engine speed of the automobile V; and a fuel gauge 22b that meter-displays a remaining amount of fuel of the automobile V.

The tachometer 22a is a mechanical meter that analog-displays the engine speed by a dial, which is added with a scale and numeric values, and by an indicator based on information of the engine speed from the meter controller 28.

The fuel gauge 22b is a mechanical meter that analog-displays the remaining amount of the fuel, by a dial, which is added with a scale and alphabets (F, E), and by an indicator based on residual amount information of the fuel from the meter controller 28.

The second meter 24 has a configuration including: a speed meter 24a that meter-displays the vehicle velocity of the automobile V; an indicator 24b that performs display of a warning, display of the operation state of the driving support control, and the like; and a coolant temperature meter 24c that meter-displays a temperature of a coolant of the engine of the automobile V.

The speed meter 24a is a mechanical meter that analog-displays the vehicle velocity of the automobile V by a dial, which is added with a scale and numeric values, and by an indicator based on velocity information of the automobile V from the meter controller 28.

The indicator 24b extinguishes, lights or blinks an indicator lamp with a pattern, which is prepared in advance in response to each state, in response to a display instruction that is based on information indicating a fastening state of a seatbelt, information indicating an opening/closing state of a door, and the like, the information coming from the meter controller 28. Moreover, the indicator 24b extinguishes, lights or blinks an indicator lamp for HSA in response to a display start instruction of the indicator lamp for HSA, the display start instruction being included in a rendering display instruction for HSA, which comes from the meter controller 28 and will be described later.

The coolant temperature meter 24c is a mechanical meter that analog-displays a temperature of the coolant, by a dial, which is added with a scale and alphabets (H, C), and by an indicator based on temperature information of the coolant from the meter controller 28.

In this embodiment, the liquid crystal display device 26 is composed of a TFT (Thin Film Transistor) liquid crystal display device. Based on an image display signal from the meter controller 28, which is received through the communication network 50 and the meter controller 28, this liquid crystal display device 26 displays an image (hereinafter, referred to as a support state displaying image) for notifying the driver of the operation state of the variety of driving support controls implemented by the driving support device 40.

Note that the liquid crystal display device 26 is not limited to the TFT liquid crystal display device, and may be composed of other display device such as a plasma display device, a field emission display device, and an organic EL display device as long as the other display device is a display device having recognizability equivalent to or more than that of the TFT liquid crystal display device. Moreover, details of the support state displaying images for the six types of driving support controls of the above-described (1) to (6) will be described later.

The meter controller 28 receives information sent through the communication network 50 from an automotive controller (ECU) for a variety of controls. Specifically, through the communication network 50, the meter controller 28 receives a display start instruction (described later) and display end instruction (described later) of the support state displaying image and the indicator lamp for HSA, the instructions being sent from the display controller 30. Moreover, through the communication network 50, the meter controller 28 receives information on the engine speed, the vehicle velocity and the coolant temperature, which is sent from an engine controller (not shown), and information on the remaining amount of the fuel, which is sent from a fuel controller (not shown). Besides, through the communication network 50, the meter controller 28 receives information regarding display of an indicator lamp, such as information on an open/close state of the door, which is sent from a door controller.

Moreover, the meter controller 28 reads out information on the support state displaying image from the rendering image storage memory 29 based on the received display start instruction of the support state displaying image concerned. Then, the meter controller 28 generates an image display signal of the support state displaying image thus read out, and transmits the generated image display signal to the liquid crystal display device 26.

Moreover, based on the received display end instruction for the support state displaying image, the meter controller 28 reads out, from the rendering image storage memory 29, information on a support state displaying image (hereinafter, referred to as a default image) for notifying the driver that the driving support control is not operating. Then, the meter controller 28 generates an image display signal of the default image thus read out, and transmits the generated image display signal to the liquid crystal display device 26.

Moreover, the meter controller 28 transmits the received display start instruction for the indicator lamp for HSA to the indicator 24b of the second meter 24. Furthermore, the meter controller 28 transmits the received display end instruction for the indicator lamp for HSA to the indicator 24b of the second meter 24.

Moreover, the meter controller 28 transmits the received information on the engine speed and the remaining amount of the fuel to the first meter 22, and transmits the received information on the vehicle velocity and the coolant temperature to the second meter 24. Furthermore, the meter controller 28 transmits the received information regarding the indicator display to the second meter 24.

Note that, in this embodiment, the first meter 22 and the second meter 24 are composed of the mechanical meters; however, the first meter 22 and the second meter 24 are not limited to this configuration, and may be configured to perform graphic display for a part or all of each of the meters, which compose the first meter 22 and the second meter 24 concerned, on a display screen of the liquid crystal display device. In this configuration, the liquid crystal display device that displays the respective meters may be composed of a single meter or a plurality of meters. Moreover, the liquid crystal display device 26 may be configured to be upsized and to also serve for the meter display.

The rendering image storage memory 29 is a memory that stores rendering images (support state displaying images) to be displayed on the liquid crystal display device 26. In this embodiment, the rendering image storage memory 29 stores rendering images, which are prepared in advance so as to individually correspond to the above-described six types of the driving support controls. Note that details of the rendering images will be described later.

Moreover, in this embodiment, the meter device 20 is assembled to a position of an automotive dashboard (not shown), which is located in front of a driver's seat. For example, as shown in FIG. 3, the meter device 20 has an exterior configuration, in which, in a meter panel 21 with a front view shape formed by vertically inverting a "recessed" shape and rounding all corner portions thereof, the rectangular oblong liquid crystal display device 26 is arranged on a center thereof, the circular first meter 22 is arranged on a left side thereof, and the circular second meter 24 is arranged on a right side thereof. Note that an arrangement position of the meter device 20 is adjusted so that, when a driver with a preset frame faces to the front in a state of being seated on the driver's seat at a preset seat position, the display screen of the liquid crystal display device 26 can stay within a peripheral visual field on a lower side of the driver. That is to say, in this embodiment, desirably, a height or the like of the seat is adjusted in response to the driver's frame, whereby position adjustment is performed so that the display screen of the liquid crystal display device 26 can stay within the peripheral visual field on the lower side of the driver.

(Display Controller 30)

Returning to FIG. 1, the display controller 30 performs display control for the liquid crystal display device 26 and the indicator 24b, which are provided in the meter device 20. Specifically, based on the operation flag and the steering angle θs, which are received through the communication network 50 from the driving support device 40 and the steering angle sensor 3, the display controller 30 performs display control to display, on the liquid crystal display device 26, the support state displaying image for notifying the driver of the operation state of the driving support device 40. Moreover, in this embodiment, the display controller 30 performs display control for the indicator lamp for HSA in the indicator 24b at a time when HSA as one of the driving support controls is operating.

Figure 4:
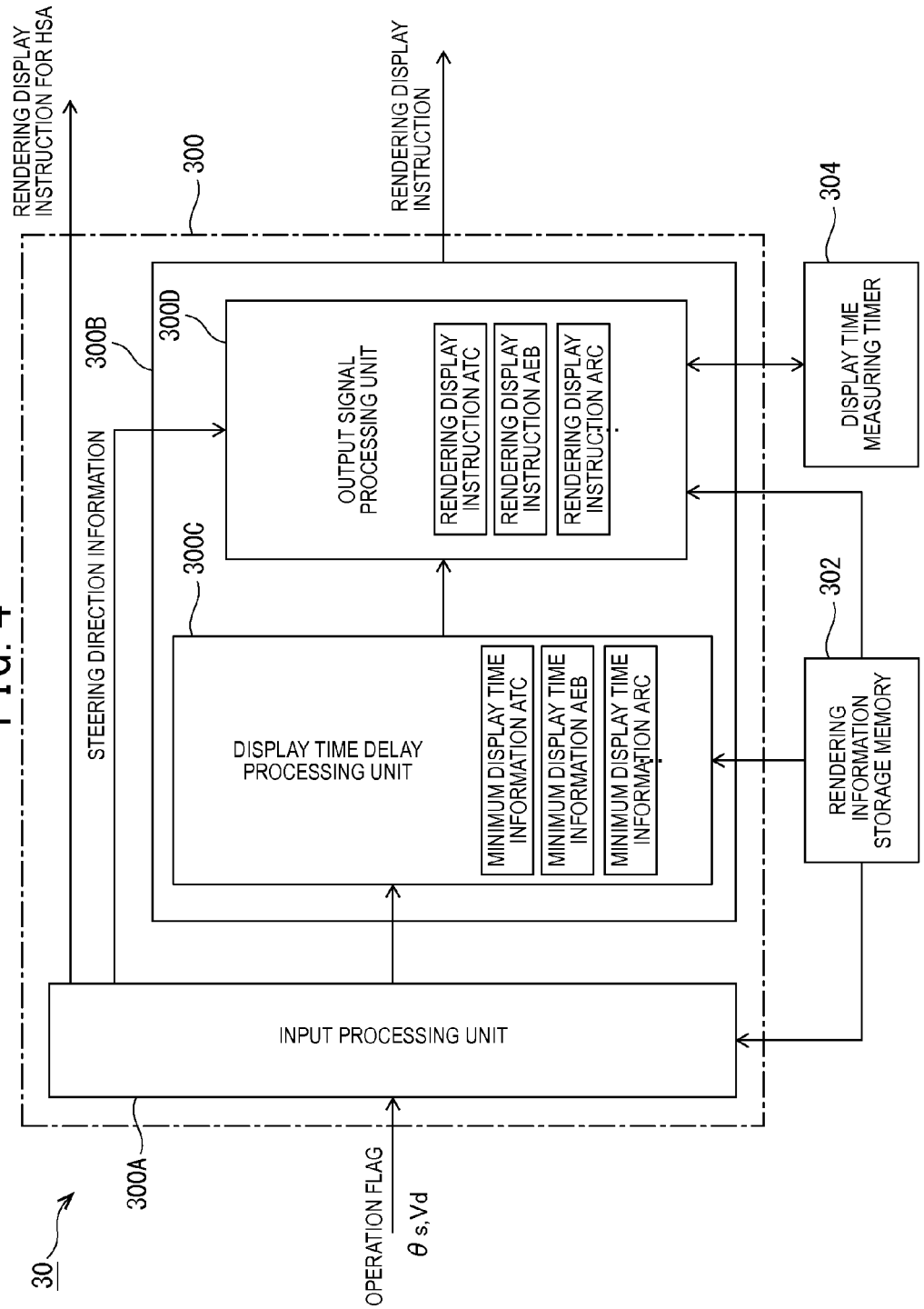
FIG. 4 is a block diagram showing an example of a specific configuration of a display controller 30.

A description is made below of a specific configuration of the display controller 30 based on FIG. 4. FIG. 4 is a block diagram showing an example of the specific configuration of the display controller 30.

As shown in FIG. 4, the display controller 30 includes: a display controlling ECU 300; a rendering information storage memory 302; and a display time measuring timer 304.

The display controlling ECU 300 has a configuration including an input processing unit 300A and a display control unit 300B. Moreover, the display control unit 300B has a configuration including a display time delay processing unit 300C and an output signal processing unit 300D.

The input processing unit 300A receives the operation flags of the variety of the driving support controls, which come from the driving support device 40, through the communication network 50. Moreover, the input processing unit 300A receives the steering angle θs, which come from the steering angle sensor 3, through the communication network 50. Then, the input processing unit 300A inputs the received operation flags to the display time delay processing unit 300C.

Moreover, the input processing unit 300A implements processing for determining a steering direction based on the received steering angle θs and a preset steering angle threshold value. Specifically, the input processing unit 300A compares an absolute value of the received steering angle θs and the preset steering angle threshold value with each other, and determines that right steering is performed, for example, in a case of having determined that an absolute value of a positive steering angle θs is the steering angle threshold value or more. Meanwhile, the input processing unit 300A determines that left steering is performed, for example, in a case of having determined that an absolute value of a negative steering angle θs is the steering angle threshold value or more. Note that, in a case of having determined that the absolute value of the steering angle θs is less than the steering angle threshold value, the input processing unit 300A determines that the automobile V is in a straight traveling state (state where the steering wheel 1 is located at a neutral position). Then, the input processing unit 300A inputs information (hereinafter, referred to as steering direction information) on the steering direction, which is based on a result of the determination, to the output signal processing unit 300D.

Here, the steering direction information includes information on a left steering flag and a right steering flag.

The left steering flag is a flag, which indicates that the left steering is performed, at a time of an ON state (for example, where the signal level is the high level), and a flag, which indicates that the left steering is not performed, at a time of an OFF state (for example, where the signal level is the low level).

Meanwhile, the right steering flag is a flag, which indicates that the right steering is performed, at the time of the ON state (for example, where the signal level is the high level), and a flag, which indicates that the right steering is not performed, at the time of the OFF state (for example, where the signal level is the low level).

Moreover, the left steering flag and the right steering flag indicate that the steering wheel 1 is located at the neutral position when both thereof are in the OFF state.

Moreover, the input processing unit 300A receives the BHS information, which is from the driving support device 40, the operation flag HSA, and the vehicle velocity Vd, which is from the other system, through the communication network 50. Then, the input processing unit 300A transmits a rendering display instruction for HSA, which is based on the received BHS information, operation flag HSA and vehicle velocity Vd, and includes a display instruction of the supporting state displaying image and a display instruction of the indicator lamp for HSA, through the communication network 50 to the meter device 20.

The display time delay processing unit 300C determines that the operation state of the driving support control based on the operation flag inputted thereto. Then, upon having determined that at least one driving support control of the above-described five types of the driving support controls excluding HSA is activated, the display time delay processing unit 300C acquires information (hereinafter, referred to as minimum display time information) on a minimum display time, which is preset for the driving support control determined to be activated, from the rendering information storage memory 302. Note that, in this embodiment, it is possible to set the minimum display time for each type of the driving support controls.

Here, the minimum display time is, in an event of displaying the support state displaying image on the display screen of the liquid crystal display device 26, a time of displaying the support state displaying image concerned continuously for a period as a lower limit to enhance recognizability of a display content of the driver. In this embodiment, basically, the support state displaying image is displayed continuously during the operation of the driving support control. Meanwhile, in a case where the driving support control is ended before elapse of the minimum display time preset for the driving support control concerned, the support state displaying image is displayed continuously until the elapse of the minimum display time concerned.

However, in this embodiment, in a case where other driving support control is activated during an operation of a certain driving support control, display of the support state displaying time for such a subsequently activated driving support control is executed immediately even if the display time of the support state displaying time for such a previously activated driving support control does not elapse for more than the minimum display time. That is to say, later-priority display control is performed.

Moreover, the minimum display time is information in which information indicating the type of the driving support control and a constant (for example, a count value of a timer, and the like) indicating the minimum display time corresponding to the type concerned are associated with each other.

The display time delay processing unit 300C inputs such minimum display time information, which is acquired from the rendering information storage memory 302, and the operation flag, which is supplied thereto, to the output signal processing unit 300D.

Based on the inputted minimum display time information and the inputted steering direction information, the output signal processing unit 300D reads out display pattern information of the support state displaying image, which corresponds to the driving support control concerned, from the rendering information storage memory 302. Then, based on the readout display pattern information and the count value of the display time measuring timer 304, the output signal processing unit 300D generates the rendering display instruction, and transmits the generated rendering display instruction through the communication network 50 to the meter device 20.

Here, the rendering display instruction is instruction information including: the display start instructions, display switch instructions and the display end instructions for the variety of the support state displaying images, the display start instruction and the display end instruction for the indicator lamp for HSA, and the like.

Upon having determined that the operation flag has turned to the ON state, the output signal processing unit 300D transmits the display start instruction for the support state displaying image of the driving support control concerned to the meter device 20 through the communication network 50. Moreover, after transmitting the display start instruction, the output signal processing unit 300D allows the display time measuring timer 304 to start a counting operation, and measures the display time of the support state displaying image.

Then, based on the count value of the display time measuring timer 304, the output signal processing unit 300D determines display end timing of the support state displaying image under display.

Specifically, upon having determined that the operation flags are in the OFF state (all of the operation flags are in the OFF state) and the display time of the support state displaying image has elapsed for more than the minimum display time, the output signal processing unit 300D that it is the display end timing.

Moreover, upon having determined that the operation flags are in the OFF state (all of the operation flags are in the OFF state) after the display time of the support state displaying image under display has elapsed for more than the minimum display time, the output signal processing unit 300D that it is the display end timing.

Upon having determined that it is the display end timing, the output signal processing unit 300D transmits the display end instruction through the communication network 50 to the meter device 20. That is to say, the output signal processing unit 300D determines that there is not any of the driving support controls under operation, and allows the liquid crystal display device 26 to display the default image.

Meanwhile, upon having determined that the operation flag of the other driving support control has turned to the ON state before the display time of the support state displaying image under display has elapsed for more than the minimum display time, the output signal processing unit 300D transmits the display switch instruction through the communication network 50 to the meter device 20.

Here, the display switch instruction is a display instruction to switch the support state displaying image under display to a support state displaying image of the other driving support control in which the operation flag has turned to the ON state, and to display the switched support state displaying image.

Moreover, in this embodiment, for the driving support control in which an operation scene is definite, first, such a support state displaying image (hereinafter, referred to as a control intervening-time display image) to be displayed when it is determined that the driving support control is intervened is prepared in advance. Furthermore, a support state displaying image (hereinafter, referred to as a scene-by-scene rendering image) to be displayed in a switched manner from the control intervening-time display image when it is determined that the scene has turned to a preset operation scene is prepared in advance. That is to say, these images are pre-stored in the rendering image storage memory 29 of the meter device 20.

Specifically, in the driving support controls ATC and AEB, such scenes where the driving support controls are activated are definite such as a case where the automobile V is under turning operation (however, such activation is not limited to the case where the automobile V is under turning operation). In this embodiment, for the driving support controls ATC and AEB, the control intervening-time display images and the scene-by-scene rendering images with graphic patterns individually corresponding to the steering directions (left steering, right steering) indicated by the steering direction information are pre-stored in the rendering image storage memory 29.

Upon having determined that ATC or AEB is in the operation state based on the acquired operation flag ATC or AEB, the output signal processing unit 300D reads out the display pattern information of the driving support control ATC or AEB from the rendering information storage memory 302. Then, upon having determined that the driving support control ATC or AEB is in the intervening state (operation state and an event where the steering wheel 1 is at the neutral position) based on the readout display pattern information and the acquired steering direction information, the output signal processing unit 300D generates the display start instruction for the control intervening-time display image. Then, the output signal processing unit 300D transmits the generated display start instruction to the meter device 20 through the communication network 50.

Meanwhile, upon having determined that the driving support control ATC or AEB is operating in the preset scene (operation state and an event where the steering wheel 1 is under left steering or right steering) based on the operation flag ATC or AEB and the steering direction information, the output signal processing unit 300D generates the display switch instruction to the scene-by-scene rendering image corresponding to the left steering or the right steering. Then, the output signal processing unit 300D transmits the generated display switch instruction to the meter device 20 through the communication network 50. Note that, in this embodiment, the scene-by-scene rendering image is displayed only for a period while the left steering or the right steering is performed. That is to say, even if the minimum display time has not elapsed from the display of the scene-by-scene rendering image, the output signal processing unit 300D performs a display control to make switch display to the control intervening-time display image at a point of time when the left steering or the right steering is ended. However, until a total display time from the initial display of the control intervening-time display image, the total display time intervening the display of the scene-by-scene rendering image therein, elapses for more than the minimum display time, the output signal processing unit 300D performs the display control to continuously perform the display of the control intervening-time display image even if the operation flag ATC or AEB turns to the OFF state.

The rendering information storage memory 302 is a memory that stores: the minimum display time information of the variety of the driving support controls; and the display pattern information of the support state displaying images corresponding to the variety of the driving support controls. In this embodiment, the rendering information storage memory 302 stores the driving support controls ATC, AEB, ARC, SMB and HDC and the minimum display time information. In addition, the rendering information storage memory 302 stores the display pattern information of the support information displaying images of the driving support controls ATC, AEB, ARC, SMB, HDC and HSA.

The display time measuring timer 304 is a timer that resets the count value in response to a reset instruction from the output signal processing unit 300D, and starts the counting in response to a count start instruction from the output signal processing unit 300D. Then, the display time measuring timer 304 inputs the counted count value to the output signal processing unit 300D.

(Support State Displaying Image)

Next, based on FIG. 5 to FIG. 11, a description is made of the support state displaying images individually corresponding to the above-described six types of the driving support controls.

(Configuration of Display Screen and Default Image)

Figure 5:
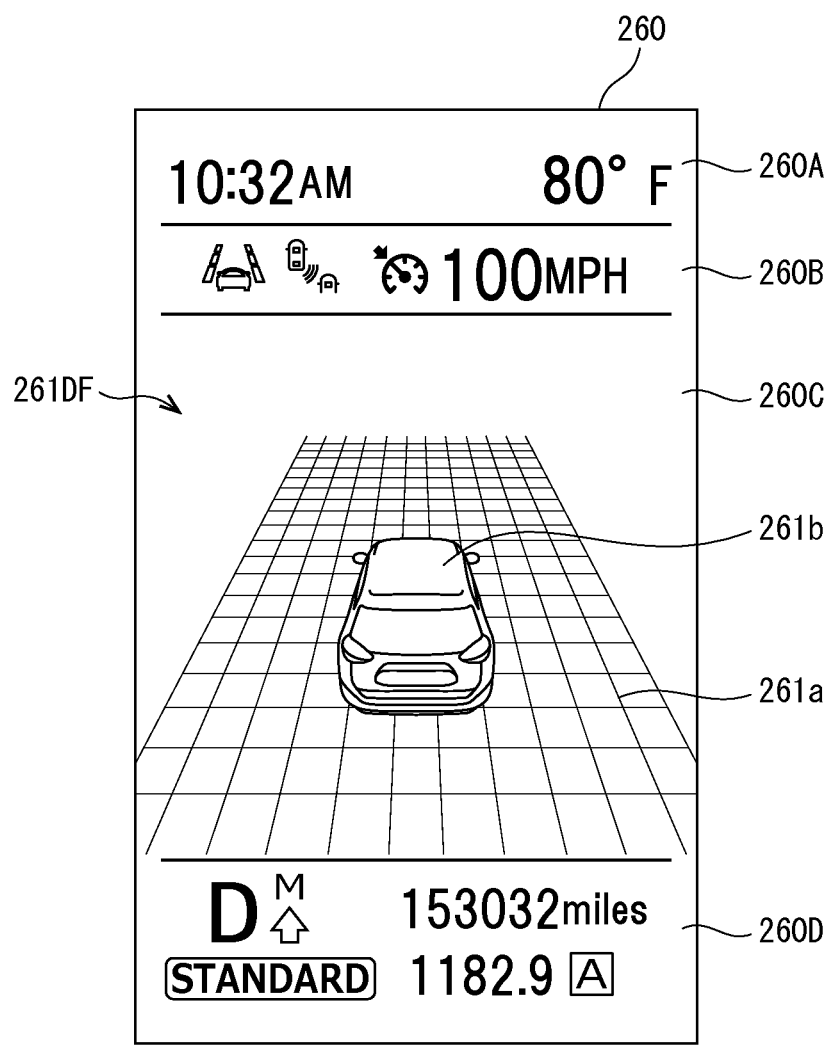
FIG. 5 is a view showing an example of a display screen of a liquid crystal display device 26 and an example of a default image.

First, based on FIG. 5, a description is made of a configuration of the display screen of the liquid crystal display device 26 and the default image to be displayed at the non-operation time of the driving support control. FIG. 5 is a view showing an example of the display screen of the liquid crystal display device 26 and an example of the default image.

As shown in FIG. 5, in a display screen 260 of the liquid crystal display device 26, a display region on an image is divided into four regions, which are: a first display region 260A, a second display region 260B; a third display region 260C; and a fourth display region 260D.

The first information region 260A is a region for displaying information such as a time and an air temperature.

The second display region 260B is a region for displaying information such as an operation state of a lane keep assist control, an inter-vehicle distance maintenance control, and a vehicle velocity setting value of a constant vehicle velocity traveling control.

The third information region 260C is a region for displaying the support state displaying image.

The fourth display region 260D is a region for displaying information such as measured values of a shift position, a travel mode and the odometer, and a measured value of a trip meter.

As shown in FIG. 5, on the third display region 260C, a default image 261DF is displayed. The default image 261DF is an image to be displayed when any of the driving support controls is not operating, and as shown in FIG. 5, has a configuration including a mesh image 261a and a vehicle image 261b.

The mesh image 261a is a grid-like planar image. The vehicle image 261b is, for example, an image from a viewpoint of looking down the same type of vehicle as the automobile V from an upper rear in a vehicle longitudinal direction.

The vehicle image 261b is displayed to be superimposed on the mesh image 261a. The mesh image 261a has a shape, which is extended in the vehicle longitudinal direction (far and near direction) of the vehicle image 261b, wherein a width (overall width and width of the grid) in a direction (hereinafter, referred to as a crosswise direction) perpendicular to the longitudinal direction concerned is wider toward the rear (near side), and the width concerned is narrower toward the front (far side). The vehicle image 261b is displayed to be superimposed on a substantial center in the longitudinal direction and crosswise direction of the mesh image 261a.

Moreover, in the present and following support state displaying images including the default image 261DF, a background color is white for convenience of illustration; however, desirably, is set to be a background color such as black, which can make use of a display effect to be described later, which allow the support state displaying images to look like emitting light.

(Control Intervening-Time Display Image and Scene-by-Scene Rendering Image)

Figure 6:
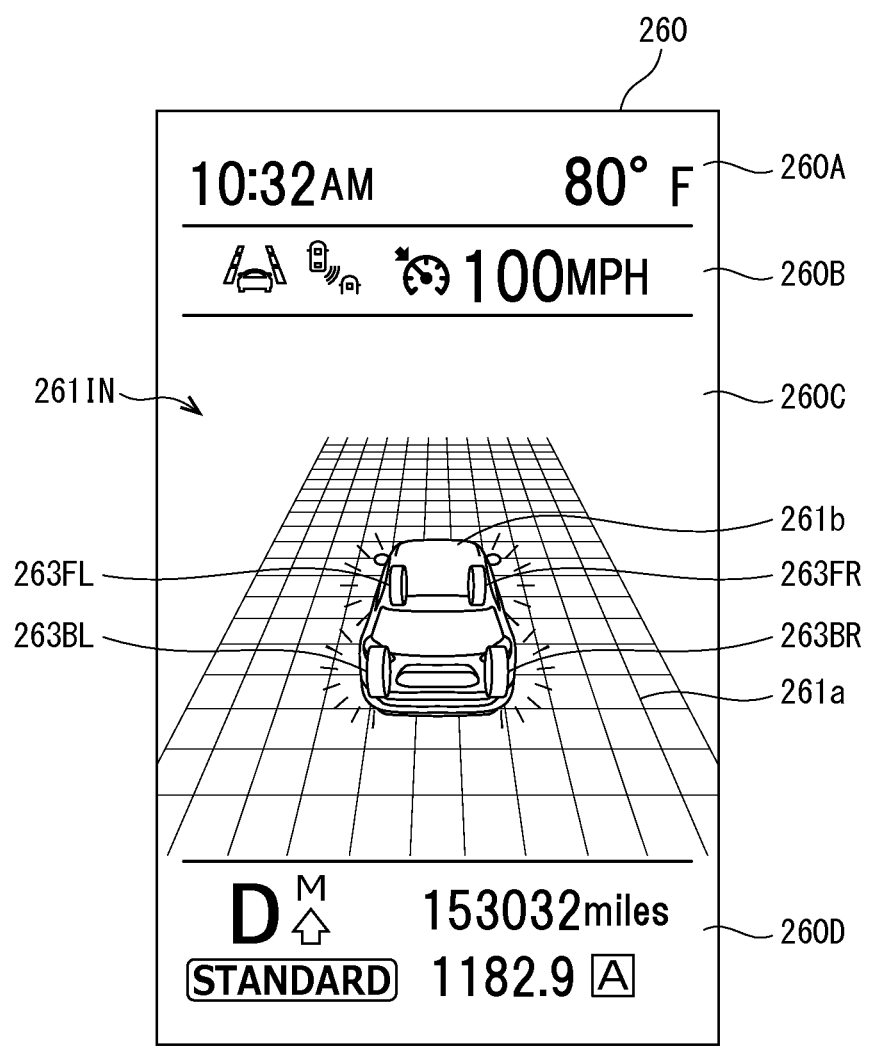
FIG. 6 is a view showing an example of a display image when a control is intervened.
Figure 7B:
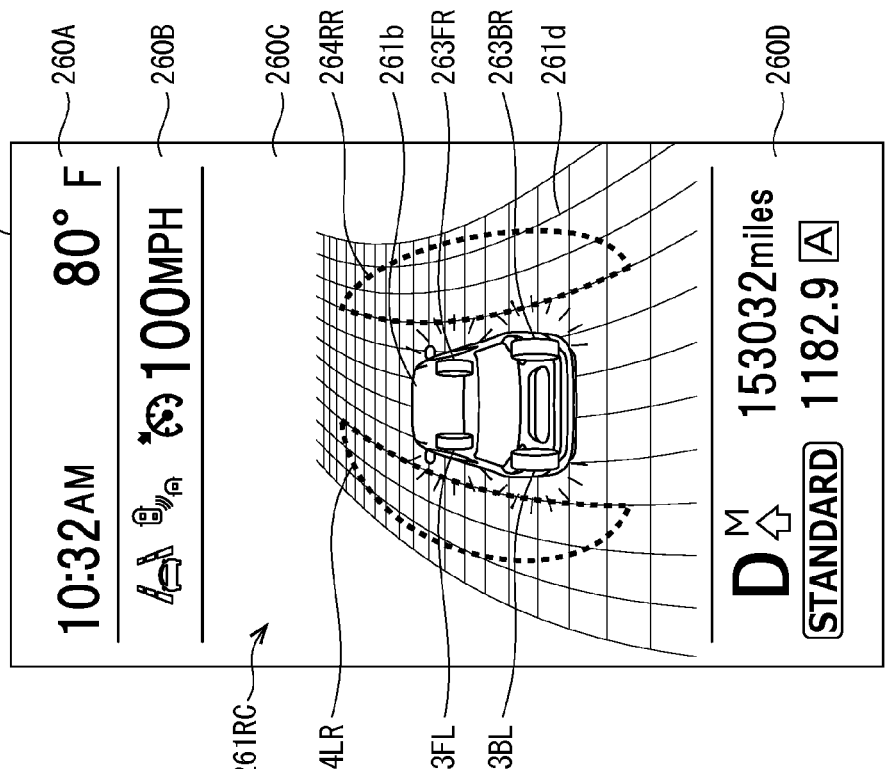
FIG. 7A to 7B are views showing examples of scene-by-scene-basis rendering images.
Figure 7A:
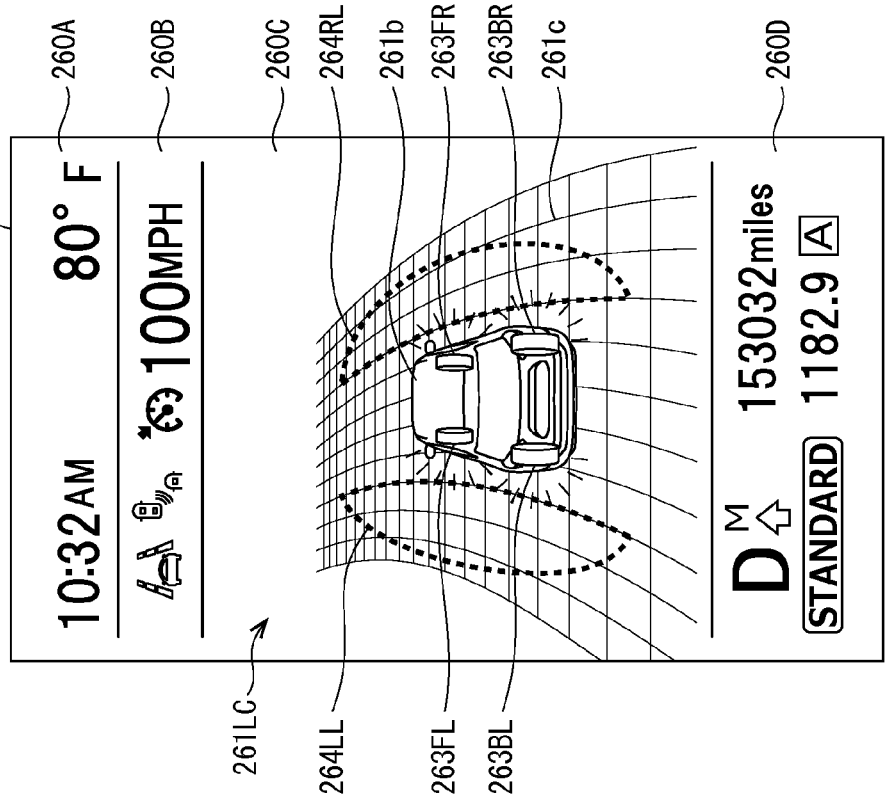

Next, based on FIG. 6 to FIGS. 7A and 7B, a description is made of each support state displaying image to be displayed at the time when the driving support control ATC or AEB is operating. FIG. 6 is a view showing an example of the control intervening-time display image. FIGS. 7A and 7B are views showing examples of the scene-by-scene rendering image. FIG. 7A is a view showing an example of a scene-by-scene rendering image (hereinafter, referred to as a left steering rendering image) when the left steering is determined, and FIG. 7B is a view showing an example of scene-by-scene rendering image (hereinafter, referred to as a right steering rendering image) when the right steering is determined.

A control intervening-time display image 261IN shown in FIG. 6 is the support state displaying image to be displayed when the driving support control ATC or AEB intervenes. In the default image 261DF of FIG. 5, the control intervening-time display image 261IN becomes an image in which wheel images are displayed to be superimposed on wheel positions in the vehicle image 261b. Specifically, a wheel image 263FL is displayed to be superimposed on a front left wheel position, a wheel image 263FR is displayed to be superimposed on a front right wheel position, a wheel image 263BL is displayed to be superimposed on a rear left wheel position, and a wheel image 263BR is displayed to be superimposed on a rear right wheel position. Note that the wheel images 263FL, 263FR, 263BL and 263BR are displayed to be superimposed on the vehicle image 261b by a display color that exerts the display effect that allows the wheels to look like emitting light (hereinafter, this display mode is referred to as four wheel lighting display). Here, the display color exerting the display effect that allows the wheels to look like emitting light becomes, for example, a display color obtained by implementing gradation, highlight and the like for a base, which is blue, green and the like, in a case where the background color is black.

Meanwhile, a left steering rendering image 261LC shown in FIG. 7A is the support state displaying image to be displayed when the operation flag ATC or AEB is in the ON state and the left steering flag is in the ON state. The left steering rendering image 261LC has a configuration including: a left curve mesh image 261c, which is obtained by deforming the mesh image 261a of FIG. 6 into a shape curved leftward; the vehicle image 261b; and the wheel images 263FL, 263FR, 263BL and 263BR. In the left steering rendering image 261LC, a semicircular effect display region 264LL, in which a circular arc portion faces to a left outside, is further provided on a vehicle left side on a periphery of the vehicle image 261b. Moreover, in the left steering rendering image 261LC, a semicircular effect display region 264RL, in which a circular arc portion faces to a right outside, is further provided on a vehicle right side on the periphery of the vehicle image 261b. The effect display regions 264LL and 264RL have a size to an extent that surrounds an entirety of the vehicle image 261b when a circle is drawn by connecting both thereof to each other. In this embodiment, the effect display regions 264LL and 264RL, which are regions surrounded by broken lines in FIG. 7A, are displayed by such a display color exerting the display effect that allows the regions concerned to look like emitting light. At this time, gradation display is performed so that brightness (or lightness) can be higher in regions of the effect display regions 264LL and 264RL, which are closer to the vehicle image 261b, and that the brightness (or lightness) can be lower in regions thereof farther from the vehicle image 261b. Note that the wheel images 263FL, 263FR, 263BL and 263BR in the left steering rendering image 261LC are also subjected to the four wheel lighting display in a similar way to the control intervening-time display image 261IN of FIG. 6 described above.

Moreover, in this embodiment, as shown in FIG. 7A, the effect display regions 264LL and 264RL are not provided on a region excluding two lines on a left end and a right end, the region belonging to a region equivalent to six lines which are located in a crosswise center of the left curve mesh image 261LC and are extended in the far and near direction. In such a way, a center region, which is not subjected to the effect display, is configured to look like a travel road.

Moreover, a right steering rendering image 261RC shown in FIG. 7B is the support state displaying image to be displayed when the operation flag ATC or AEB is in the ON state and the right steering flag is in the ON state. The right steering rendering image 261RC has a configuration including: a right curve mesh image 261d, which is obtained by deforming the mesh image 261a of FIG. 5 into a shape curved rightward; the vehicle image 261b; and the wheel images 263FL, 263FR, 263BL and 263BR. In the right steering rendering image 261RC, a semicircular effect display region 264LR, in which a circular arc portion faces to a left outside, is further provided on a vehicle left side on the periphery of the vehicle image 261b. Moreover, in the right steering rendering image 261RC, a semicircular effect display region 264RR, in which a circular arc portion faces to a right outside, is further provided on a vehicle right side on the periphery of the vehicle image 261b.

Note that the right steering rendering image 261RC is an image, which is made symmetrical to the left steering rendering image 261LC, and performs a similar effect display to that of the left steering effect image 261LC.

(Support State Displaying Image for ARC)

Figure 8:
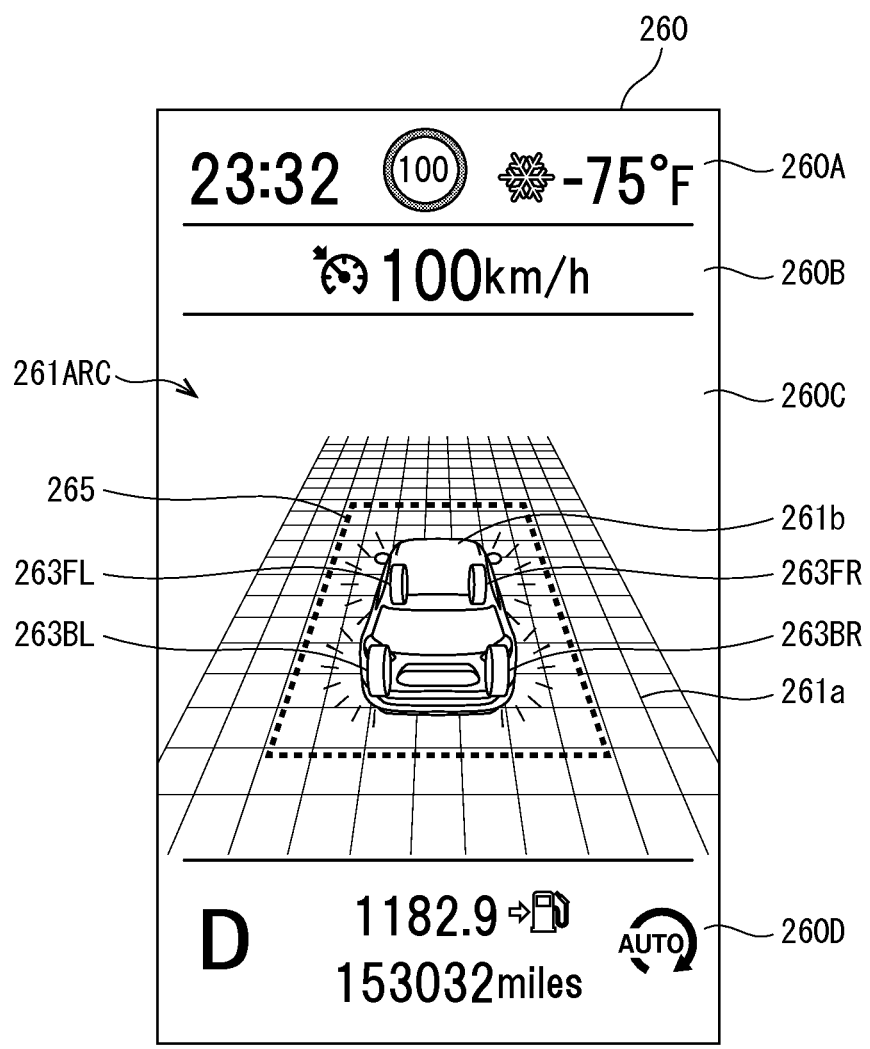
FIG. 8 is a view showing an example of a rendering image 261ARC as a support state displaying image for ARC.

Next, based on FIG. 8, a description is made of the support state displaying image to be displayed at a time when the driving support control ARC is operating. FIG. 8 is a view showing an example of the rendering image 261ARC that is the support state displaying image for ARC.

The rendering image 261ARC shown in FIG. 8 is the support state displaying image to be displayed when the operation flag ARC is in the ON state. As shown in FIG. 8, the rendering image 261ARC has a configuration including: the mesh image 261a; the vehicle image 261b; the wheel images 263FL, 263FR, 263BL and 263BR; and an effect display region 265.

The effect display region 265 is a region obtained by surrounding a periphery of the vehicle image 261 into a rectangular shape.

In this embodiment, a color of lines which form a grid in a region surrounded by the effect display region 265 is displayed by such a display color exerting the display effect that allows the lines concerned to look like emitting light.

Moreover, the wheel images 263FL, 263FR, 263BL and 263BR in the rendering image 261ARC are subjected to the four wheel lighting display.

Here, the above-described driving support control ARC is a control to reduce a deterioration of riding comfort, which is caused by a fact that the automobile V gets over irregularities on a road, by rapidly converging motions of a vertical behavior, a crosswise behavior and the like of the vehicle body, which are caused by a fact that the automobile V gets over the irregularities. That is to say, the support state displaying image for ARC aims at a display effect of giving the driver a feeling of safety, which is given as if a road surface within the effect display region 265 on the periphery of the vehicle image 261b were a leveled ground, by allowing light emission of the lines in the region.

(Support State Displaying Image for SMB)

Next, based on FIGS. 9A to 9E, a description is made of the support state displaying images to be displayed at a time when the driving support control SMB is operating. FIGS. 9A to 9E are views showing examples of the rendering images SMB which are the support state displaying images for SMB.

The rendering images $261SMB_1$ to $262SMB_5$ shown in FIGS. 9A to 9E are the support state displaying images to be displayed when the operation flag SMB is in the ON state.

Figure 9A:
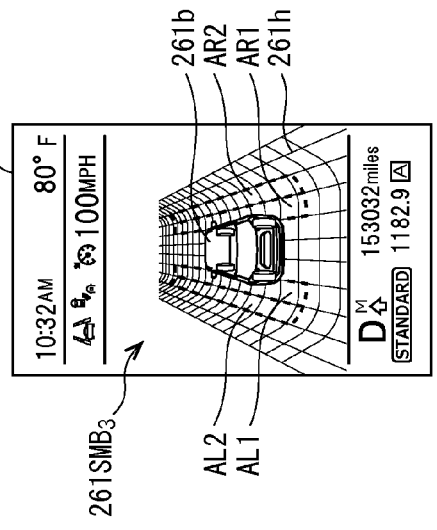
FIGS. 9A to 9E are views showing examples of rendering images SMB as support state displaying images for SMB.

As shown in FIG. 9A, the rendering image $261SMB_1$ has a configuration including: an HP-shaped mesh image 261h; and the vehicle image 261b.

The HP-shaped mesh image 261h is a halfpipe-shaped image in which both of crosswise ends of the mesh image 261a shown in FIG. 5 are rounded and bent so as to be lifted up. By adopting such a shape, walls are formed on both of crosswise sides of the vehicle image 261b.

Figure 9B:
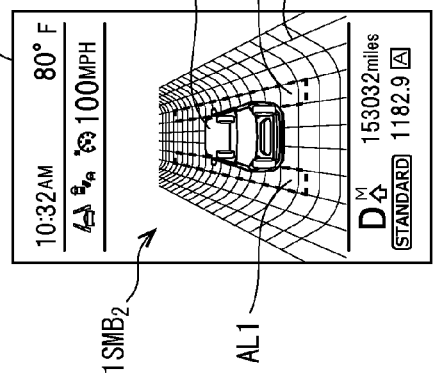

As shown in FIG. 9B, the rendering image $261SMB_2$ has a configuration in which, on the mesh image 261a of the rendering image $261SMB_1$, a left-side effect display region AL1, which is located close to a left side of the vehicle image 261b, and a right-side effect display region AR1, which is located close to a right side of the vehicle image, the left-side and right-side effect display regions AL1 and AR1 being indicated by broken line portions, are provided. In this embodiment, the rendering image $261SMB_2$ is displayed by a display color exerting the display effect that allows insides of the left-side effect display region AL1 and the right-side effect display region AR1 to look like emitting light (hereinafter, this display is referred to as light emission display).

Figure 9C:
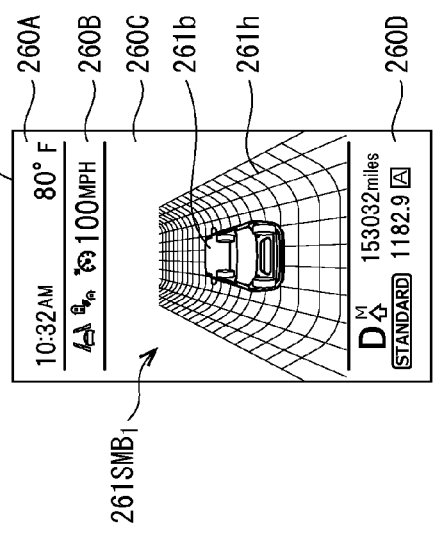

As shown in FIG. 9C, the rendering image $261SMB_3$ has a configuration in which, in addition to the rendering image $261SMB_2$, a left-side effect display region AL2 adjacent to a left side of the left-side effect display region AL1 of the mesh image 261a is provided. In addition, the rendering image $261SMB_3$ has a configuration in which a right-side effect display region AR2 adjacent to a right side of the right-side effect display region AR1 of the mesh image 261a is provided. In this embodiment, the rendering image $261SMB_3$ performs the light emission display for the left-side effect display regions AL1 and AL2 and the right-side effect display regions AR1 and AR2.

Figure 9D:
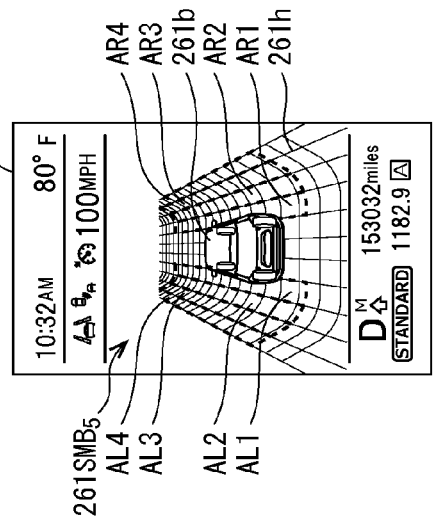

As shown in FIG. 9D, the rendering image $261SMB_4$ has a configuration in which, in addition to the rendering image $261SMB_3$, a left-side effect display region AL3 adjacent to a left side of the left-side effect display region AL2 of the mesh image 261a is provided. In addition, the rendering image $261SMB_4$ has a configuration in which a right-side effect display region AR3 adjacent to a right side of the right-side effect display region AR2 of the mesh image 261a is provided. In this embodiment, the rendering image $261SMB_4$ performs the light emission display for the left-side effect display regions AL1 to AL3 and the right-side effect display regions AR1 to AR3.

Figure 9E:
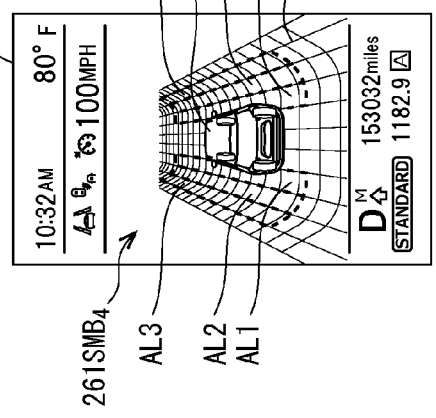

As shown in FIG. 9E, the rendering image $261SMB_5$ has a configuration in which, in addition to the rendering image $261SMB_4$, a left-side effect display region AL4 adjacent to a left side of the left-side effect display region AL3 of the mesh image 261a is provided. In addition, the rendering image $261SMB_5$ has a configuration in which a right-side effect display region AR4 adjacent to a right side of the right-side effect display region AR3 of the mesh image 261a is provided. In this embodiment, the rendering image $261SMB_5$ performs the light emission display for the left-side effect display regions AL1 to AL4 and the right-side effect display regions AR1 to AR4.

In this embodiment, for the above-described rendering images $261SMB_1$ to $261SMB_5$, the light emission display is performed so that the brightness (or lightness) can be higher in the regions thereof closer to the vehicle image 261b in the far and near direction, and that the brightness (or lightness) can be lower in the regions thereof farther from the vehicle image 261b.

Moreover, in this embodiment, the above-described rendering images $261SMB_1$ to $261SMB_5$ are displayed continuously, whereby animation display is performed.

Specifically, the driver turns ON an SMB switch (not shown) for activating the driving support control, whereby the operation flag SMB turns to the ON state. In such a way, the display controller 30 performs a display control to switch the display image of the third display region 260C of the liquid crystal display device 26 to the rendering image $261SMB_1$. Subsequently, the display controller 30 performs such a display control to display the rendering image $261SMB_1$, the rendering image $261SMB_2$, the rendering image $261SMB_3$, the rendering image $261SMB_4$ and the rendering image $261SMB_5$ in this order. In such a way, animation display, in which the rendering images $261SMB_1$ to $261SMB_5$ sequentially emit light from the side near the vehicle image 261b, is performed, and a state is brought, where both of the crosswise sides of the vehicle image 261b are surrounded by such walls which emit light. Thereafter, the driver turns OFF the SMB switch, whereby the operation flag SMB turns to the OFF state. In such a way, the display controller 30 performs such a display control to display the rendering image $261SMB_5$, the rendering image $261SMB_4$, the rendering image $261SMB_3$, the rendering image $261SMB_2$ and the rendering image $261SMB_1$ in this order on the third display region 260C of the liquid crystal display device 26. In such a way, animation display, in which the light is extinguished from the crosswise outsides of the mesh image 261a to the inside thereof, is performed. Thereafter, the display controller 30 performs a display control to display the default image 261DF on the third display region 260C of the liquid crystal display device 26.

(Support State Displaying Image for HSA)

Next, based on FIGS. 10A and 10B, a description is made of the support state displaying image to be displayed at a time when the driving support control HSA is operating. FIGS. 10A and 10B are views showing examples of rendering images 261HSA which are the support state displaying images for HSA.

A rendering image 261HSA(S) shown in FIG. 10A is a support state displaying image to be displayed at a time when the operation flag HSA is in the ON state and the brake pedal 16 is in a depressed state (hereinafter, referred to as a BH (Brake Hold) state).

Meanwhile, a rendering image 261HSA(O) shown in FIG. 10B is a support state displaying image to be displayed at a time when, in the BH state, the driver releases the brake pedal 16, and a state where a holding operation of a brake fluid pressure in HSA is activated is brought (hereinafter, this state is referred to as a fluid pressure holding operation state).

Hereinafter, in a case where the rendering image 261HSA(S) and the rendering image 261HSA(O) are not distinguished from each other, both thereof are simply referred to as the rendering images 261HSA.

As shown in FIGS. 10A and 10B, each rendering image 261HSA has s configuration including: a mesh image 261e;

a vehicle image 261*f*; wheel images 263SFL and 263SBL; and an uphill display line 266.

The mesh image 261*e* is a background image composed by intersecting a plurality of lines with one another in a grid shape. The vehicle image 261*f* is, for example, a left side image of the same type of vehicle as the automobile V when viewed from front in the drawing, and is displayed to be superimposed on the mesh image 261*e*. The wheel image 263SFL is an image of a front left wheel in the vehicle image 261*f*. The wheel image 263SBL is an image of a rear left wheel in the vehicle image 261*f*. The uphill display line 266 is a straight line (straight line having an inclination angle of, for example, 15[°] with respect to a lower edge of the third display region 260C) extended obliquely left upward from a lower side of a screen right end of the third display region 260C toward a screen left end thereof, and is a line that expresses an uphill viewed transversely.

Hence, the mesh image 261*e* is not displayed on a region opposite to a road surface side in the third display region 260*c* with respect to the uphill display line 266 taken as a boundary, but is displayed only on a region on the road surface side.

The vehicle image 261*f* is arranged so that a vehicle front-side tip end of the vehicle image 261*f* can face obliquely left upward along the uphill display line 266 in order that tire lower ends of the wheel images 263SFL and 263SBL can contact the uphill display line 266 from a side of the uphill display line 266 concerned, which becomes the road surface. That is to say, the vehicle image 261HSA is an image showing a state where the vehicle is stopped on the way of climbing the uphill.

Moreover, in this embodiment, the display controller 30 displays tire portions of the wheel images 263SFL and 263SBL in the rendering image 261HSA(S) by a display color exerting the display effect that allows the tire portions to look like emitting light. Hereinafter, this display mode is referred to as wheel lighting display.

Moreover, in this embodiment, the display controller 30 displays the tire portions of the wheel images 263SFL and 263SBL in the rendering image 261HSA(O) in a display mode of alternately repeating a state of displaying the tire portions by the display color exerting the display effect that allows the tire portions to look like emitting light and a state of displaying the tire portions by a display color (for example, a color with low brightness (lightness), such as black), which allows the tire portions to look like being extinguished in contrast to the light emission display. Hereinafter, this display mode is referred to as wheel blinking display.

Moreover, in this embodiment, as shown in a lower portion of FIG. 10A, the display controller 30 performs a display control to light and display an indicator lamp 240HSA for HSA in synchronization with the wheel lighting display of the rendering image 261HSA(S).

Moreover, in this embodiment, as shown in a lower portion of FIG. 10B, the display controller 30 performs a display control to blink and display the indicator lamp 240HSA for HSA in synchronization with the wheel blinking control of the rendering image 261HSA(O).

(Support State Displaying Image for HDC)

Figure 11:
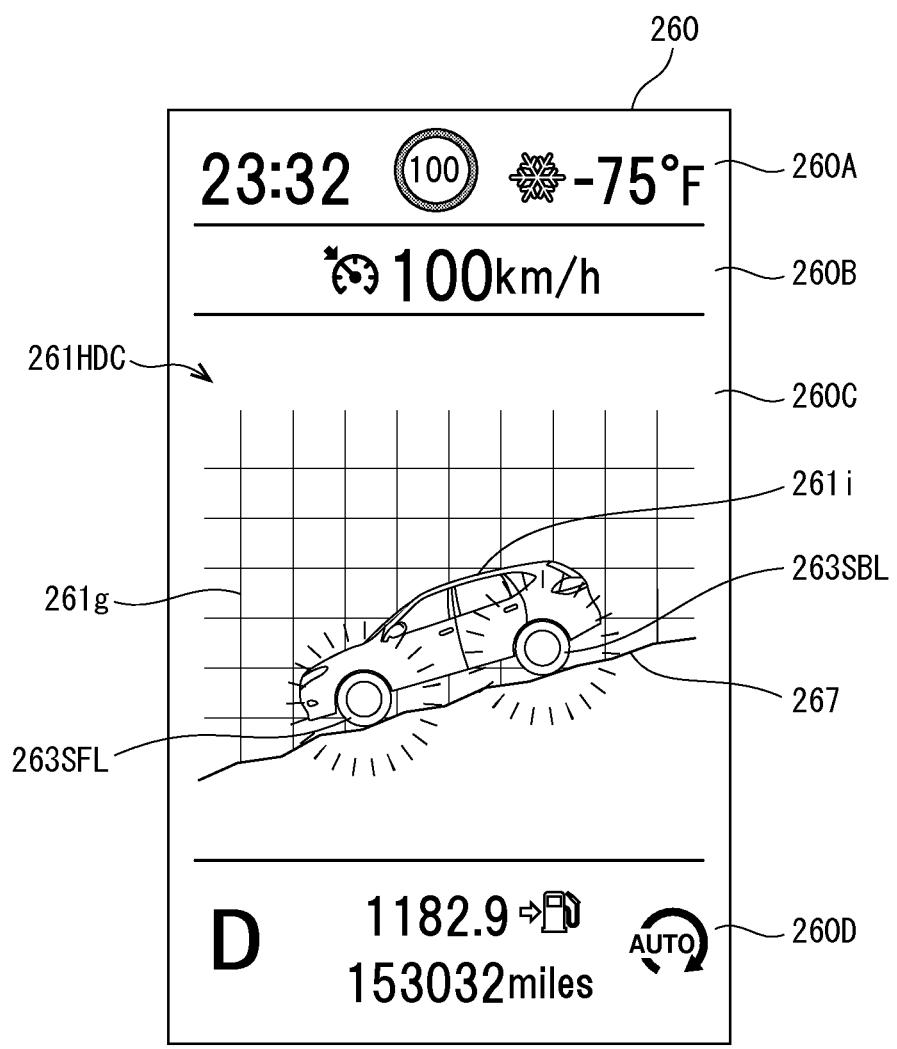
FIG. 11 is view showing an example of a rendering image 261HDC as a support state displaying image for HDC.

Next, based on FIG. 11, a description is made of the support state displaying image to be displayed at a time when the driving support control HDC is operating. FIG. 11 is a view showing an example of the rendering image 261HDC that is the support state displaying image for HDC.

The rendering image 261HDC shown in FIG. 11 is the support state displaying image to be displayed when the operation flag HDC is in the ON state. Note that the driving support control HDC is activated by turning a dedicated switch (hereinafter, referred to as an HDC switch) to an ON state after fixing the automobile V to a four wheel drive state.

As shown in FIG. 11, the rendering image 261HDC has s configuration including: a mesh image 261*g*; a vehicle image 261*i*; the wheel images 263SFL and 263SBL; and a downhill display line 267.

The mesh image 261*g* is a background image with a pattern composed by intersecting a plurality of lines with one another in a grid shape.

The vehicle image 261*i* is, for example, a left side image of the same type of vehicle as the automobile V when the left side image is viewed from front in the drawing, and is displayed to be superimposed on the mesh image 261*g*.

The downhill display line 267 is a wavy line (wavy line having an inclination angle of, for example, 15[°] with respect to the lower edge of the third display region 260C) extended obliquely right upward from a lower side of a screen left end of the third display region 260C toward a screen right end thereof, and is a line that expresses a downhill, which is viewed transversely and has a bad road surface condition.

Hence, the mesh image 261*g* is not displayed on a region opposite to the road surface side in the third display region 260*c* with respect to the downhill display line 267 taken as a boundary, but is displayed only on a region on the road surface side.

The vehicle image 261*i* is arranged so that a vehicle front-side tip end of the vehicle image 261*i* can face obliquely left downward along the downhill display line 267 in order that the tire lower ends of the wheel images 263SFL and 263SBL can contact the downhill display line 267 from a road surface side of the downhill display line 267. That is to say, the vehicle image 261HDC is an image showing a state where the vehicle goes down the downhill.

Moreover, in this embodiment, the display controller 30 displays tire portions of the wheel images 263SFL and 263SBL in the rendering image 261HDC by a display color exerting the display effect that allows the tire portions to look like emitting light (this display is the wheel lighting display).

Note that, with regard to the above-described driving support controls ATC, AEB, ARC and SMB, occurrence situations thereof are situations where the driving load is relatively large, the situations including those where the vehicle velocity of the automobile V is relatively high, the automobile V performs a turning operation, and the automobile V gets over the irregularities which give a large input. Hence, in such situations as described above, it becomes difficult for the driver to gaze the display screen 260 of the liquid crystal display device 26, and to recognize a detailed display content thereon. Accordingly, in this embodiment, for the driving support controls ATC, AEB, ARC and SMB, in which the driving loads are relatively high, the vehicle image is arranged on the mesh-like planar image, and in addition, the support state displaying image with a composition of looking down the vehicle from the upper rear is displayed. In addition, at the time when the driving support controls ATC, AEB, ARC and SMB are operating, the mesh image portion on the periphery of the vehicle image is subjected to the light emission display. Moreover, in the travel scene where the driving support control is definitely operating at such a time of the turning traveling, the shape of the mesh image is changed in response to the operation of the driver in addition to the light emission display of the mesh image portion on the periphery of the vehicle image. In such a way, it becomes possible for the driver to recognize which type of the driving support controls is operating by an instantaneous movement of the line of sight and by the peripheral visual field without gazing the display screen 260 of the liquid crystal display device 26.

Meanwhile, in the above-described driving support controls HSA and HDC, the operation situations thereof are situations where the driving load is relatively small, the situations including those where the automobile V is stopped on the way of an uphill with a steep gradient, and where the automobile V travels on a downhill with a steep gradient, a snowy road and the like at a relatively low vehicle velocity. Hence, in such situations as described above, it becomes relatively easy for the driver to see the display screen 260 of the liquid crystal display device 26 and to recognize the display content thereon. Accordingly, in this embodiment, at the operating time of each of the driving support controls HSA and HDC, in which the driving loads are relatively small, the vehicle image in which the side of the vehicle is viewed from front in the drawing is displayed, and in addition, a notification on the operation state of the driving support control is issued by the light emission display or the blinking display of the tire portions of the wheel image in the vehicle image. In such a way, it becomes possible for the driver to recognize a relatively detailed operation situation of the driving support control from the display content of the liquid crystal display device 26. Moreover, in this embodiment, the vehicle image portion of the rendering image 261HSA is formed into a shape similar to the indicator lamp 240HSA. In such a way, it becomes easy for the driver to recognize that the driving support control HSA is operating at the time of seeing the rendering image 261HSA.

(Operations)

A description is made below of the operations of this embodiment based FIG. 12 to FIG. 17.

[Display Control Operation Based on Minimum Display Time Information]

Figure 12:
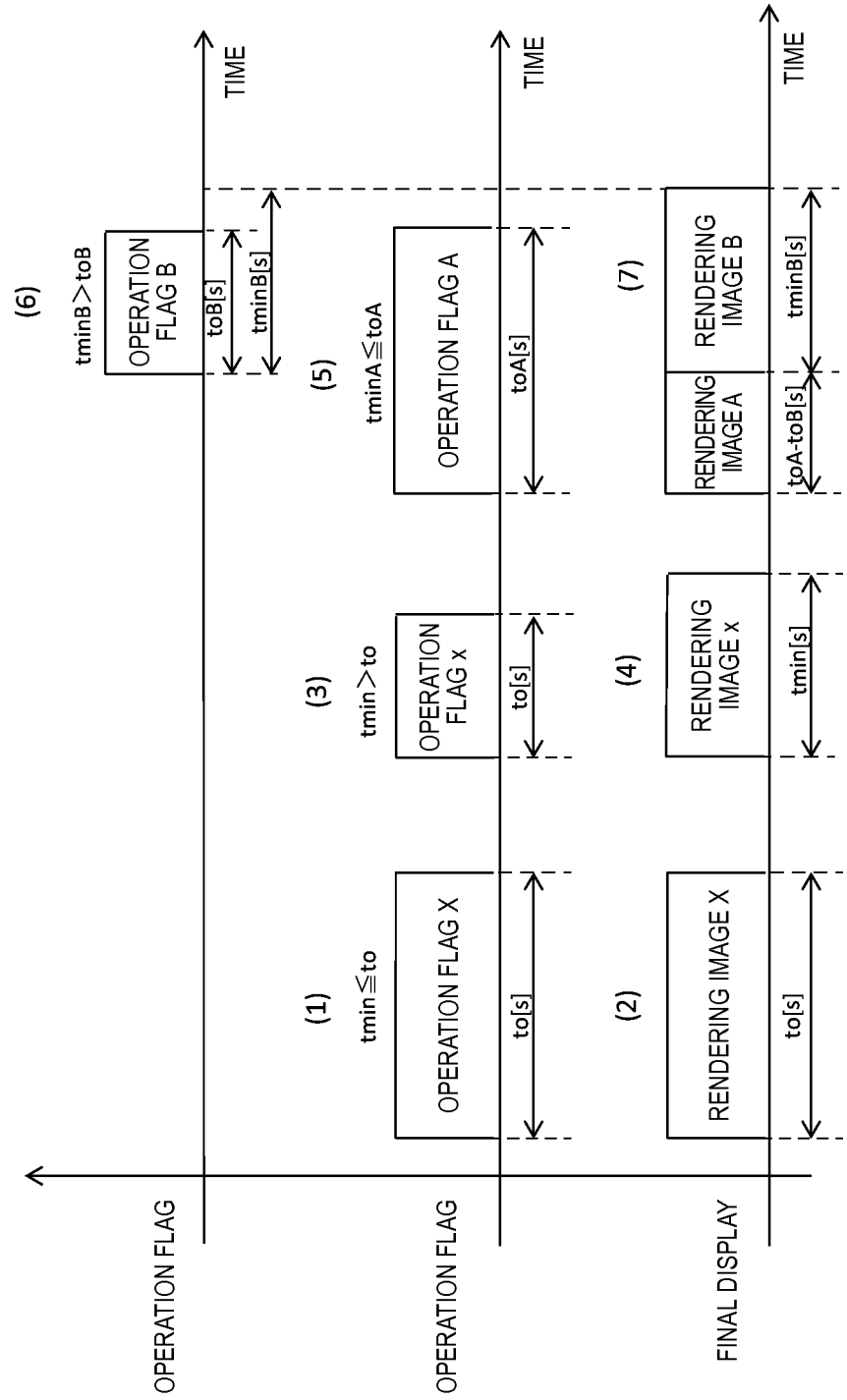
FIG. 12 is a time chart for explaining an operation example at a time of a display control that is based on a minimum display time information of the first embodiment.

Based on FIG. 12, a description is made of the operations at the time of the display control for the support state displaying image, which is based on the minimum display time information of the display controller 30. FIG. 12 is a time chart for explaining an operation example at the time of the display control that is based on the minimum display time information of this embodiment.

First, a description is made of an operation example in a case where, as shown in (1) in FIG. 12, a time while an operation flag X of a driving support control X is in the ON state, that is, an operation time tox of the driving support control X is longer than the minimum display time tminx. Note that, in this embodiment, the driving support control X is any one control of the driving support controls ATC, AEB, ARC, SMB and HDC.

Upon having determined that the operation flag X inputted from the input processing unit 300A has turned to the ON state, the display time delay processing unit 300C reads out the minimum display time tminx, which corresponds to the driving support control X, as the minimum display time information from the rendering information storage memory 302. Then, the display time delay processing unit 300C inputs the readout minimum display time tminx and the inputted operation flags (all of the operation flags) to the output signal processing unit 300D.

Upon having determined that the operation flag X has turned to the ON state based on the operation flag inputted from the display time delay processing unit 300C, the output signal processing unit 300D reads out the display pattern information, which corresponds to the driving support control X, from the rendering information storage memory 302. Moreover, based on the readout display pattern information, the output signal processing unit 300D generates the display start instruction X for the support state displaying image X (hereinafter, referred to as a rendering image X) corresponding to the driving support control X. Moreover, the output signal processing unit 300D transmits the generated display start instruction X to the meter device 20 through the communication network 50. Meanwhile, the output signal processing unit 300D outputs the start instruction for the counting operation to the display time measuring timer 304, and starts the counting operation (measurement of the display time) by the display time measuring timer 304.

Moreover, upon having received the display start instruction X from the output signal processing unit 300D, the meter controller 28 of the meter device 20 reads out the information on the rendering image X, which corresponds to the received display start instruction X, from the rendering image storage memory 29. Furthermore, the meter controller 28 acquires the variety of information, which is to be displayed on the above-described first display region 260A, second display region 260B and fourth display region 260D, through the communication network 50 from other controllers, instruments and the like. Then, the meter controller 28 generates an image display signal X of the image, which is to be displayed on the display screen 260, based on the readout information on the rendering image X and the acquired variety of information, and inputs the generated image display signal X to the liquid crystal display device 26. Note that, with regard to the variety of information, which is to be displayed on the above-described first display region 260A, second display region 260B and fourth display region 260D, contents thereof are changed in response to the time and the situation, and therefore, the image display onto the display screen 260 is updated in a preset cycle.

As shown in (2) in FIG. 12, the liquid crystal display device 26 displays the rendering image X on the display screen 260 based on the image display signal X inputted thereto.

Note that, in the example shown in (1) in FIG. 12, the operation time tox of the driving support control X is longer than the minimum display time tminx. Therefore, the output signal processing unit 300D does not end the display of the rendering image X even if the count value of the display time measuring timer 304 exceeds the minimum display time tminx, but as shown in (1) and (2) in FIG. 12, performs the display control so as to continue to display the rendering image X until the operation flag X turns to the OFF state. Specifically, upon having determined that the inputted operation flag X has turned to the OFF state, the output signal processing unit 300D generates the display end instruction for the rendering image X. Then, the output signal processing unit 300D transmits the generated display end instruction to the meter device 20 through the communication network 50.

Upon having received the display end instruction from the output signal processing unit 300D, the meter controller 28 of the meter device 20 reads out the information on the default image 261DF from the rendering image storage memory 29. Moreover, the meter controller 28 acquires the variety of information, which is to be displayed on the above-described first display region 260A, second display region 260B and fourth display region 260D, through the communication network 50 from the other controllers, instruments and the like. Then, the meter controller 28 generates the image display signal DF of the image, which is to be displayed on the display screen 260, based on the readout information on the default image 261DF and the acquired variety of information, and inputs the generated image display signal DF to the liquid crystal display device 26. The liquid crystal display device 26 displays the default image 261DF on the display screen 260 based on the image display signal DF inputted thereto.

Next, a description is made of an operation example in a case where the operation time tox of the driving support control X is shorter than the minimum display time tminx. In this case, even in a case of having determined that the operation flag X inputted from the display time delay processing unit 300C has turned to the OFF state, the output signal processing unit 300D performs the display control so as to continuously display the rendering image X until the count value becomes a value equal to or more than the value, which indicates the minimum display time tminx, as shown in (4) in FIG. 12.

That is to say, upon having determined that the count value of the display time measuring timer 304 has become the minimum display time tminx, the output signal processing unit 300D generates the display end instruction for the rendering image X. Then, the output signal processing unit 300D transmits the generated display end instruction to the meter device 20 through the communication network 50.

Next, a description is made of an operation example in a case where a driving support control B is subsequently activated while a driving support control A is operating. Note that, in this embodiment, the driving support control A is any one control of the driving support controls ATC, AEB, ARC, SMB and HDC. Moreover, in this embodiment, the driving support control B is any one control of the driving support controls ATC, AEB, ARC, SMB and HDC, which is different from the driving support control A.

As shown in (5) and (6) in FIG. 12, when the driving support control B is activated while the driving support control A is operating, the display time delay processing unit 300C determines that an operation flag B has turned to the ON state during a period of determining that an operation flag A inputted from the input processing unit 300A is in the ON state.

The display time delay processing unit 300C reads out a minimum display time tminB, which corresponds to the driving support control B, from the rendering information storage memory 302. Then, the display time delay processing unit 300C inputs the readout minimum display time tminB and the inputted operation flags to the output signal processing unit 300D.

Upon having determined that the operation flag B has turned to the ON state while the operation flag A is in the ON state based on the inputted operation flag, the output signal processing unit 300D reads out display pattern information, which corresponds to the driving support control B, from the rendering information storage memory 302. Then, based on the readout display pattern information, the output signal processing unit 300D generates a display switch instruction B for the rendering image B corresponding to the driving support control B. Moreover, the output signal processing unit 300D transmits the generated display switch instruction B to the meter device 20 through the communication network 50. Meanwhile, the output signal processing unit 300D outputs a reset instruction to the display time measuring timer 304 and resets the count value, in addition, subsequently outputs the start instruction for the counting operation to the display time measuring timer 304, and starts the counting operation by the display time measuring timer 304.

Meanwhile, upon having received the display switch instruction B from the output signal processing unit 300D, the meter controller 28 of the meter device 20 reads out the information on the rendering image B, which corresponds to the received display switch instruction B, from the rendering image storage memory 29. Furthermore, the meter controller 28 acquires the variety of information, which is to be displayed on the above-described first display region 260A, second display region 260B and fourth display region 260D, through the communication network 50 from the other controllers, instruments and the like. Then, the meter controller 28 generates an image display signal B of the image, which is to be displayed on the display screen 260, based on the readout information on the rendering image B and the acquired variety of information, and inputs the generated image display signal B to the liquid crystal display device 26.

As shown in (7) in FIG. 12, the liquid crystal display device 26 displays the rendering image B in place of the rendering image A under display based on the image display signal B inputted thereto.

Moreover, as shown in (7) in FIG. 12, the operation time toB of the driving support control B is shorter than the minimum display time tminB. Therefore, even in a case of having determined that the operation flag B inputted from the display time delay processing unit 300C has turned to the OFF state, the output signal processing unit 300D performs the display control so as to continuously display the rendering image B until the count value becomes a value equal to or more than the value, which indicates the minimum display time tminB, as shown in (7) in FIG. 12.

[Display Control Operation at Operation Time of Driving Support Control ATC or AEB]

Figure 13:
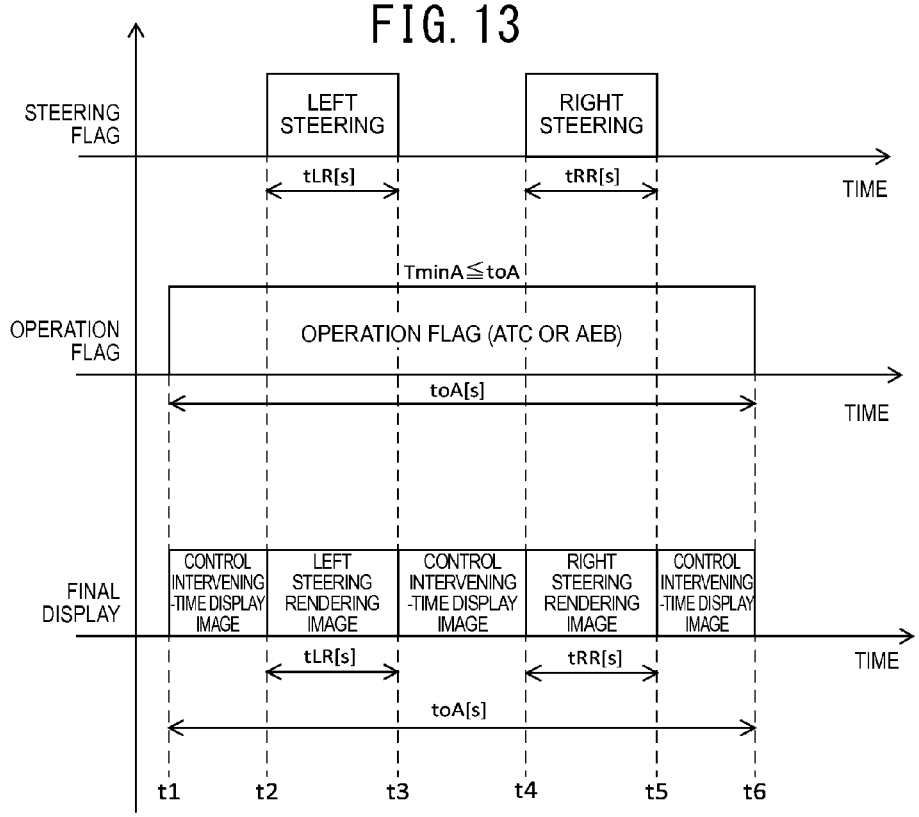
FIG. 13 is a time chart for explaining an example of a display control operation when a driving support control ATC or AEB is activated.
Figure 14:
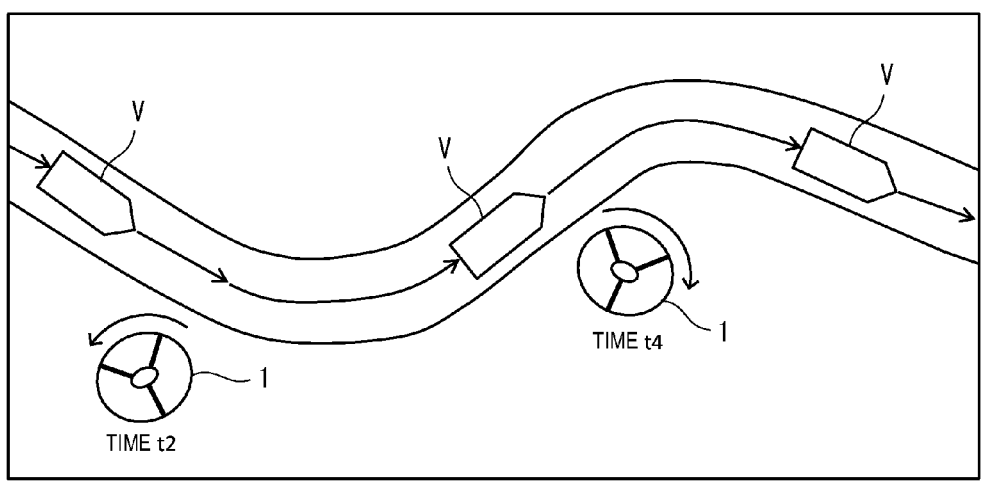
FIG. 14 is a view showing an example of a traveling scene where the driving support control ATC or AEB is activated.

Next, a description is made of the display control operation at the operation time of the driving support control ATC or AEB based on FIG. 5 to FIGS. 7A to 7B, FIG. 13 and FIG. 14. FIG. 13 is a time chart for explaining an example of the display control operation at a time when the driving support control ATC or AEB is operating. FIG. 14 is a view showing an example of travel scene where the driving support control ATC or AEB is operating. Note that, in FIG. 13 and FIG. 14, a time t2 in both thereof indicate a same point of time, and a time t4 in both thereof indicate a same point of time.

It is assumed that, as shown in FIG. 13, at a time t1, the driving support control ATC or AEB is activated, and the operation flag ATC or AEB has turns to the ON state.

In this case, the display time delay processing unit 300C reads out minimum display time information (here, this is defined to be a minimum display time tminA), which corresponds to the driving support control ATC or AEB, from the rendering information storage memory 302. Then, the display time delay processing unit 300C inputs the readout minimum display time tminA and the inputted operation flags to the output signal processing unit 300D.

Upon having determined that the operation flag ATC or AEB has turned to the ON state based on the operation flag inputted from the display time delay processing unit 300C, the output signal processing unit 300D reads out the display pattern information, which corresponds to the driving support control ATC or AEB, from the rendering information storage memory 302. Then, the output signal processing unit 300D generates a display start instruction of the rendering image, which corresponds to the driving support control ATC or AEB, based on the steering direction information (left steering flag and right steering flag) inputted from the input processing unit 300A.

Specifically, at the time t1, each of the left steering flag and the right steering flag is in the OFF state, and accordingly, the output signal processing unit 300D generates the display start instruction for the control intervening-time display image 261IN. Then, the output signal processing unit 300D transmits the generated display start instruction to the meter device 20 through the communication network 50.

In such a way, on the display screen 260 of the liquid crystal display device 26, the control intervening-time display image 261IN shown in FIG. 6 is displayed in place of the default image 261DF shown in FIG. 5, which is under display.

Next, as shown in FIG. 14, when the automobile V approaches a left curve road and the driver steers the steering wheel 1 counterclockwise by a steering amount of the steering angle threshold value or more at the time t2, then as shown in FIG. 13, the left steering flag turns to the ON state at the time t2. When the left steering flag turns to the ON state, the output signal processing unit 300D generates the display switch instruction to the left steering rendering image 261LC. Then, the output signal processing unit 300D transmits the generated display switch instruction to the meter device 20 through the communication network 50.

In such a way, on the display screen 260 of the liquid crystal display device 26, the left steering rendering image 261LC shown in FIG. 7A is displayed in place of the control intervening-time display image 261IN under display.

Thereafter, when the driver performs steering to return the steering wheel 1 to the neutral position, and both of the left steering flag and the right steering flag turn to the OFF state at a time t3 as shown in FIG. 13, then the output signal processing unit 300D generates the display switch instruction to the control intervening-time display image 261IN. Then, the output signal processing unit 300D transmits the generated display switch instruction to the meter device 20 through the communication network 50.

In such a way, on the display screen 260 of the liquid crystal display device 26, the control intervening-time display image 261IN shown in FIG. 6 is displayed in place of the left steering rendering image 261LC under display.

Subsequently, as shown in FIG. 14, when the automobile V approaches a right curve road and the driver steers the steering wheel 1 clockwise by a steering amount of the steering angle threshold value or more at the time t4, then as shown in FIG. 13, the right steering flag turns to the ON state at the time t4. When the right steering flag turns to the ON state, the output signal processing unit 300D generates the display switch instruction to the right steering rendering image 261RC. Then, the output signal processing unit 300D transmits the generated display switch instruction to the meter device 20 through the communication network 50.

In such a way, on the display screen 260 of the liquid crystal display device 26, the right steering rendering image 261RC shown in FIG. 7B is displayed in place of the control intervening-time display image 261IN under display.

Thereafter, when the driver performs the steering to return the steering wheel 1 to the neutral position, and the left steering flag turns to the OFF state at a time t5 as shown in FIG. 13, then the output signal processing unit 300D generates the display switch instruction to the control intervening-time display image 261IN. Then, the output signal processing unit 300D transmits the generated display switch instruction to the meter device 20 through the communication network 50.

In such a way, on the display screen 260 of the liquid crystal display device 26, the control intervening-time display image 261IN shown in FIG. 6 is displayed in place of the right steering rendering image 261RC under display.

Subsequently, as shown in FIG. 13, when the operation flag ATC or AEB turns to the OFF state at a time t6, the output signal processing unit 300D generates the display end instruction. Then, the output signal processing unit 300D transmits the generated display end instruction to the meter device 20 through the communication network 50.

In such a way, on the display screen 260 of the liquid crystal display device 26, the default image 261DF shown in FIG. 5 is displayed in place of the control intervening-time display image 261IN under display.

As described above, in this embodiment, when the operation flag ATC of AEB is activated, three images, which are the control intervening-time display image 261IN, the left steering rendering image 261LC and the right steering rendering image 261RC are displayed in a switched manner, whereby the driver is notified that the driving support control ATC or AEB is operating.

[Display Control Operation at Operation Time of Driving Support Control SMB]

Figure 15:
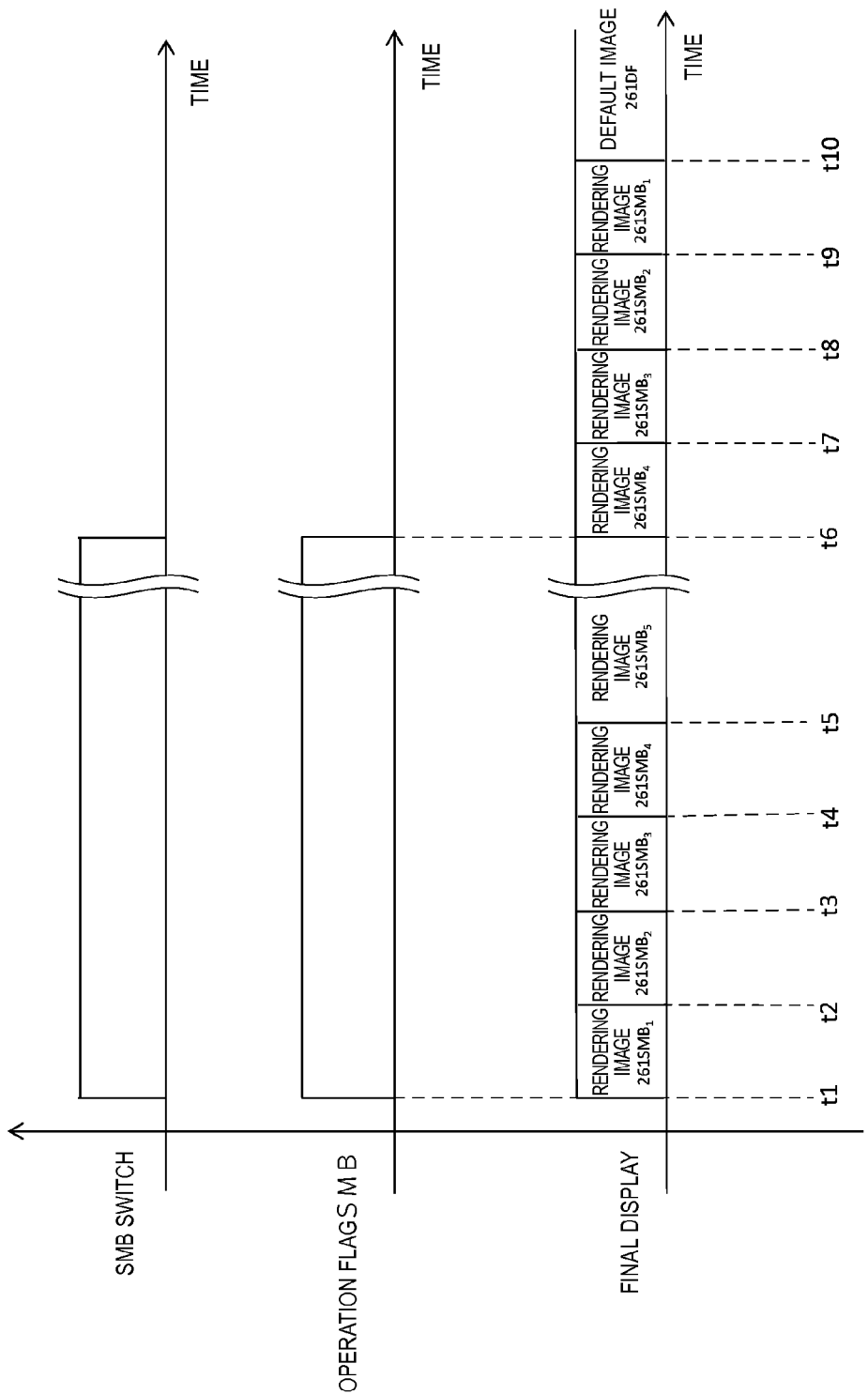
FIG. 15 is a time chart for explaining an example of a display control operation when a driving support control SMB is activated.

Next, a description is made of the display control operation at the operation time of the driving support control SMB based on FIGS. 9A to 9E and FIG. 15. FIG. 15 is a time chart for explaining an example of the display control operation at the operation time of the driving support control SMB.

As shown in FIG. 15, the SMB switch is turned ON at the time t1, whereby the operation flag SMB turns to the ON state.

In such a way, the display time delay processing unit 300C reads out minimum display time information (here, this is defined to be a minimum display time tminS), which corresponds to the driving support control SMB, from the rendering information storage memory 302. Then, the display time delay processing unit 300C inputs the readout minimum display time tminS and the inputted operation flags to the output signal processing unit 300D.

Upon having determined that the operation flag SMB, which is inputted from the display time delay processing unit 300C, has turned to the ON state, the output signal processing unit 300D reads out the display pattern information, which corresponds to the driving support control SMB, from the rendering information storage memory 302. Then, based on the readout display pattern information, the output signal processing unit 300D generates a display start instruction for the rendering image corresponding to the driving support control SMB.

Specifically, at the time t1, the output signal processing unit 300D generates a display start instruction $SMB_1$ for a rendering image $261SMB_1$. Then, the output signal processing unit 300D transmits the generated display start instruction $SMB_1$ to the meter device 20 through the communication network 50. Meanwhile, the output signal processing unit 300D outputs the start instruction for the counting operation to the display time measuring timer 304, and starts the counting operation by the display time measuring timer 304.

Meanwhile, upon having received the display start instruction $SMB_1$, the meter controller 28 of the meter device 20 reads out information on the rendering image $261SMB_1$, which corresponds to the received display start instruction $SMB_1$, from the rendering image storage memory 29 based on the received display start instruction $SMB_1$.

Moreover, the meter controller 28 acquires the variety of information, which is to be displayed on the first display region 260A, second display region 260B and fourth display region 260D of the display screen 260, through the communication network 50 from the other controllers, instruments and the like. Then, the meter controller 28 generates an image display signal $SMB_1$ of the image, which is to be displayed on the display screen 260, based on the readout information on the rendering image $SMB_1$ and the acquired variety of information, and inputs the generated image display signal $SMB_1$ to the liquid crystal display device 26.

In such a way, the rendering image $261SMB_1$ shown in FIG. 9A is displayed on the display screen 260 of the liquid crystal display device 26.

Subsequently, upon having determined that a preset display time has elapsed based on the count value of display time measuring timer 304, the output signal processing unit 300D generates a display start instruction $SMB_2$ for a rendering image $261SMB_2$. That is to say, at a time t2 shown in FIG. 15, the output signal processing unit 300D generates the display start instruction $SMB_2$ for a rendering image $261SMB_2$, and transmits the generated display start instruction $SMB_2$ to the meter device 20 through the communication network 50.

In such a way, on the display screen 260 of the liquid crystal display device 26, the rendering image $261SMB_2$ shown in FIG. 9B is displayed in place of the rendering image $261SMB_1$ shown in FIG. 9A.

Subsequently, based on the count value of the display time measuring timer 304, the output signal processing unit 300D generates a display start instruction $SMB_3$ for a rendering image $261SMB_3$ at a time t3 after the elapse of the preset display time from the time t2 shown in FIG. 15. Then, the output signal processing unit 300D transmits the generated display start instruction $SMB_3$ to the meter device 20 through the communication network 50.

In such a way, on the display screen 260 of the liquid crystal display device 26, the rendering image $261SMB_3$ shown in FIG. 9B is displayed in place of the rendering image $261SMB_2$ shown in FIG. 9B.

Subsequently, based on the count value of the display time measuring timer 304, the output signal processing unit 300D generates a display start instruction $SMB_4$ for a rendering image $261SMB_4$ at a time t4 after the elapse of the preset display time from the time t3 shown in FIG. 15. Then, the output signal processing unit 300D transmits the generated display start instruction $SMB_4$ to the meter device 20 through the communication network 50.

In such a way, on the display screen 260 of the liquid crystal display device 26, the rendering image $261SMB_4$ shown in FIG. 9D is displayed in place of the rendering image $261SMB_3$ shown in FIG. 9C.

Subsequently, based on the count value of the display time measuring timer 304, the output signal processing unit 300D generates a display start instruction $SMB_5$ for a rendering image $261SMB_5$ at a time t5 after the elapse of the preset display time from the time t4 shown in FIG. 15. Then, the output signal processing unit 300D transmits the generated display start instruction $SMB_5$ to the meter device 20 through the communication network 50.

In such a way, on the display screen 260 of the liquid crystal display device 26, the rendering image $261SMB_5$ shown in FIG. 9E is displayed in place of the rendering image $261SMB_4$ shown in FIG. 9D.

That is to say, at a preset display time interval, the rendering images $261SMB_1$ to $261SMB_5$ are continuously displayed in an order from the rendering image $261SMB_1$ through the rendering image $261SMB_2$, the rendering image $261SMB_3$ and the rendering image $261SMB_4$ to the rendering image $261SMB_5$. In such a way, the animation display, in which the left-side effect display regions AL1 to AL4 and the right-side effect display regions AR1 to AR4 are subjected to the light emission display from the sides near the vehicle image 261b, is performed.

Note that, as shown in FIG. 15, upon displaying the rendering image $261SMB_5$, the display controller 30 performs a display control to maintain the display of the rendering image $261SMB_5$ during the operation of the driving support control SMB.

Thereafter, when the driver turns OFF the SMB switch, then as shown in FIG. 15, the operation flag SMB turns to the OFF state at a time t6.

In such a way, the output signal processing unit 300D determines that the inputted operation flag SMB has turned to the OFF state. Then, next, at a preset display time interval, the output signal processing unit 300D performs a display control to continuously display the rendering images $261SMB_1$ to $261SMB_5$ in an order from the rendering image $261SMB_5$ through the rendering image $261SMB_4$, the rendering image $261SMB_3$ and the rendering image $261SMB_2$ to the rendering image $261SMB_1$.

That is to say, upon having determined that the operation flag SMB has turned to the OFF state, the output signal processing unit 300D generates the display start instruction $SMB_4$ for the rendering image $261SMB_4$. That is to say, at the time t6 shown in FIG. 15, the output signal processing unit 300D generates the display start instruction $SMB_4$ for the rendering image $261SMB_4$, and transmits the generated display start instruction $SMB_4$ to the meter device 20 through the communication network 50. Meanwhile, the output signal processing unit 300D outputs the reset instruction to the display time measuring timer 304 and resets the count value, in addition, subsequently outputs the start instruction for the counting operation to the display time measuring timer 304, and starts the counting operation by the display time measuring timer 304.

In such a way, on the display screen 260 of the liquid crystal display device 26, the rendering image $261SMB_4$ shown in FIG. 9D is displayed in place of the rendering image $261SMB_5$ shown in FIG. 9E.

Subsequently, upon having determined that the preset display time has elapsed based on the count value of display time measuring timer 304, the output signal processing unit 300D generates the display start instruction $SMB_3$ for the rendering image $261SMB_3$. That is to say, at a time t7 shown in FIG. 15, the output signal processing unit 300D generates the display start instruction $SMB_3$ for the rendering image $261SMB_3$, and transmits the generated display start instruction $SMB_3$ to the meter device 20 through the communication network 50.

In such a way, on the display screen 260 of the liquid crystal display device 26, the rendering image $261SMB_3$ shown in FIG. 9C is displayed in place of the rendering image $261SMB_4$ shown in FIG. 9D.

Subsequently, based on the count value of the display time measuring timer 304, the output signal processing unit 300D generates the display start instruction $SMB_2$ for the rendering image $261SMB_2$ at a time t8 after the elapse of the preset display time from the time t7 shown in FIG. 15. Then, the output signal processing unit 300D transmits the generated display start instruction $SMB_2$ to the meter device 20 through the communication network 50.

In such a way, on the display screen 260 of the liquid crystal display device 26, the rendering image $261SMB_2$ shown in FIG. 9B is displayed in place of the rendering image $261SMB_3$ shown in FIG. 9C.

Subsequently, based on the count value of the display time measuring timer 304, the output signal processing unit 300D generates the display start instruction $SMB_1$ for the rendering image 261$SMB_1$ at a time t9 after the elapse of the preset display time from the time t8 shown in FIG. 15. Then, the output signal processing unit 300D transmits the generated display start instruction $SMB_1$ to the meter device 20 through the communication network 50.

In such a way, on the display screen 260 of the liquid crystal display device 26, the rendering image 261$SMB_1$ shown in FIG. 9A is displayed in place of the rendering image 261$SMB_2$ shown in FIG. 9B.

Subsequently, based on the count value of the display time measuring timer 304, the output signal processing unit 300D generates a display start instruction DF for the default image 261DF at a time t10 after the elapse of the preset display time from the time t9 shown in FIG. 15. Then, the output signal processing unit 300D transmits the generated display start instruction DF to the meter device 20 through the communication network 50.

In such a way, on the display screen 260 of the liquid crystal display device 26, the default image 261DF shown in FIG. 5 is displayed in place of the rendering image 261$SMB_1$ shown in FIG. 9A.

[Display Control Operation at Operation Time of Driving Support Control HSA]

Figure 16:
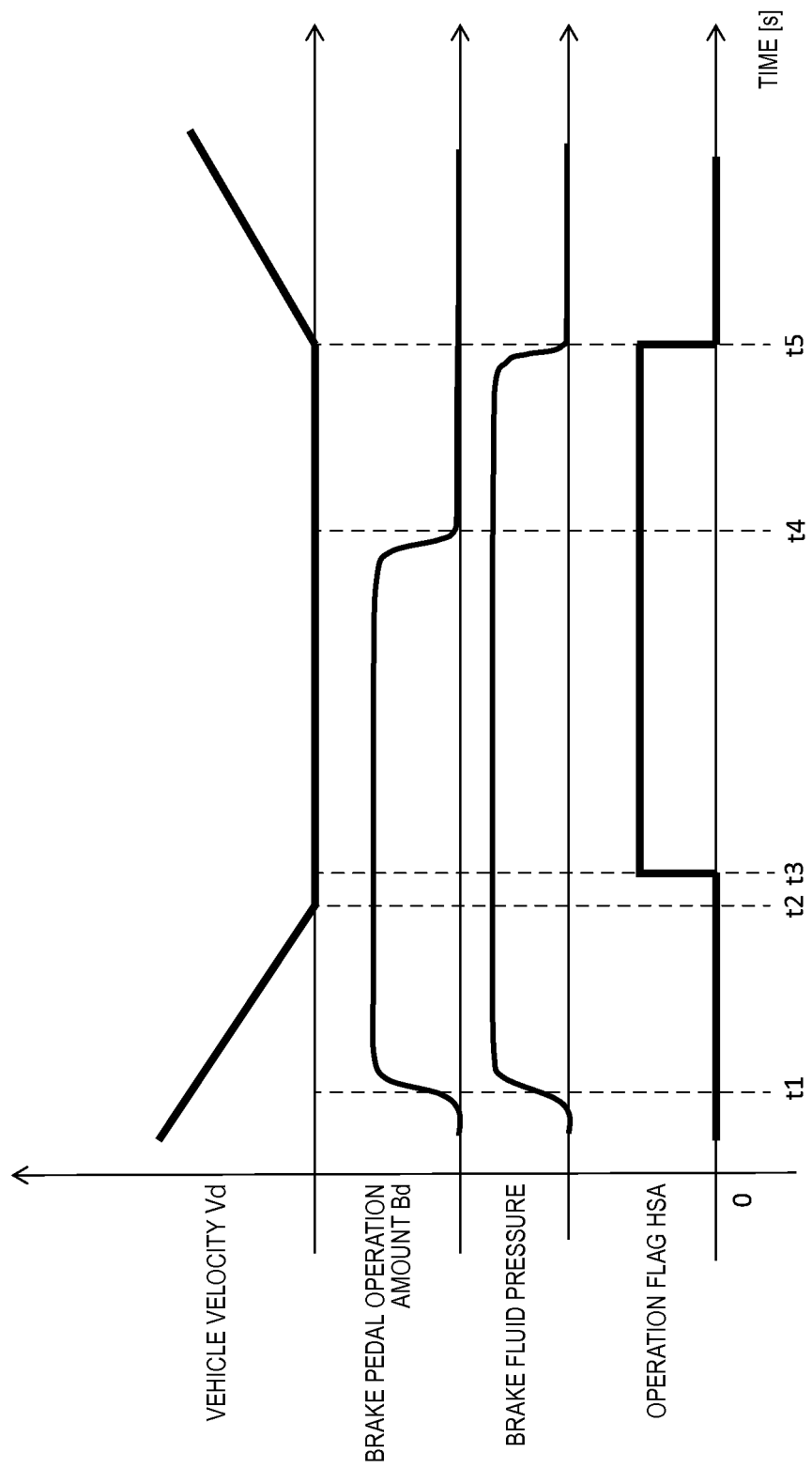
FIG. 16 is a chart showing an example of time changes of a vehicle velocity Vd, a brake pedal operation amount Bd, a brake fluid pressure and an operation flag HSA in an operation scene of a driving support control HSA.
Figure 17:
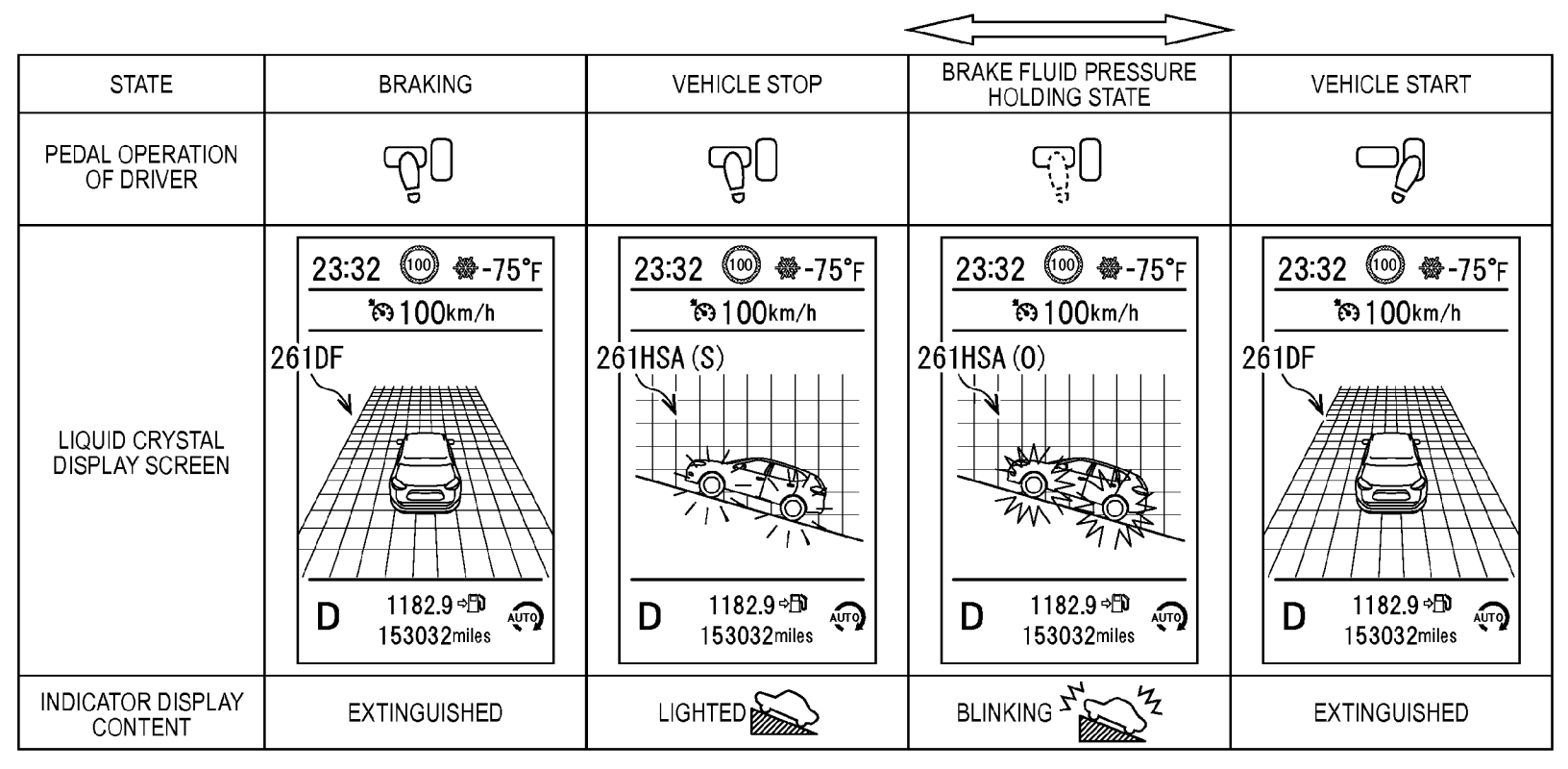

Next, a description is made of the display control operation at the operation time of the driving support control HSA based on FIG. 16 and FIG. 17A. FIG. 16 is a chart showing an example of time changes of the vehicle velocity Vd, the brake pedal operation amount Bd, the brake fluid pressure and the operation flag HSA in an operation scene of a driving support control HSA. FIG. 17 is a view showing an example of progresses of the display content of the display screen 260 and a lighting state of the indicator lamp 240HSA for HSA with respect to progresses of the traveling state of the automobile V and a pedal operation state of the driver in the operation scene of the driving support control HSA.

As shown in FIG. 16, when the driver depresses the brake pedal 16 at a time t1 while the automobile V is traveling on an uphill (this traveling is sensed by an inclination sensor), the BHS information, which indicates the depression state of the brake pedal 16, is transmitted from the driving support device 40 through the communication network 50 to the display controller 30. Meanwhile, as shown in FIG. 16, by a fact that the brake pedal 16 is depressed, a brake fluid pressure rises, and the brake is activated. In such a way, the vehicle velocity Vd drops.

As shown in FIG. 16, in a state where the vehicle velocity Vd continues to drop during a period from the time t1 to t2 by the fact that the brake pedal 16 is depressed, the operation flag HSA turns to the OFF state. Therefore, the input processing unit 300A determines that the driving support control HSA is not operating. Moreover, other driving support controls are not operating here, and the output signal processing unit 300D implements display control processing for the default image 261DF. In such a way, as shown in a liquid crystal display screen column corresponding to a state column of the braking in FIG. 17, the default image 261DF is displayed on the display screen 260 of the liquid crystal display device 26. In addition, since the operation flag HSA turns to the OFF state, the indicator lamp 240HSA for HSA turns to the extinguished state as shown in an indicator display content column corresponding to the state column of the braking in FIG. 17.

Next, as shown in FIG. 16, when the vehicle velocity Vd becomes 0 at a time t2 in the state where the brake pedal 16 is depressed, the operation flag HSA turns to the ON state at a time t3 after elapse (for example, after approximately 1 [s]) of a preset time. That is to say, the operation flag HSA in the ON state and the other operation flags in the OFF state are transmitted from the driving support device 40 through the communication network 50 to the display controller 30.

In such a way, the input signal processing unit 300A determines that the operation flag HSA has turned to the ON state based on the received operation flags. In addition, the input processing unit 300A determines that the brake pedal 16 is depressed based on the received BHS information. In such a way, the input processing unit 300A reads out display pattern information, which corresponds to the driving support control HSA, from the rendering information storage memory 302. Then, the input processing unit 300A generates the display start instruction HSA(S) for the rendering image 261HSA(S) of the driving support control HSA and a lighting display instruction for the indicator lamp 240HSA for HSA. Moreover, the input processing unit 300A transmits the rendering display instruction for HSA, which includes the generated display start instruction HSA(S) and lighting display instruction, to the meter device 20 through the communication network 50.

Meanwhile, the meter controller 28 of the meter device 20 receives the rendering display instruction for HSA, which comes from the input processing unit 300A and includes the display start instruction HSA(S) and the lighting display instruction. Based on the received rendering display instruction for HSA, the meter controller 28 reads out information on the rendering image 261HSA(S), which corresponds to the display start instruction HSA(S), from the rendering image storage memory 29. Moreover, the meter controller 28 acquires the variety of information, which is to be displayed on the first display region 260A, second display region 260B and fourth display region 260D of the display screen 260, through the communication network 50 from the other controllers, instruments and the like. Then, the meter controller 28 generates an image display signal HSA(S) of the image, which is to be displayed on the display screen 260, based on the readout information on the rendering image HSA(S) and the acquired variety of information, and inputs the generated image display signal HSA(S) to the liquid crystal display device 26. Simultaneously, the meter controller 28 inputs the lighting display instruction for the indicator lamp 240HSA to the indicator 24b of the second meter 24.

In such a way, as shown in a liquid crystal display screen column corresponding to a state column of vehicle stop in FIG. 17, the rendering image 261HSA(S) is displayed on the display screen 260 of the liquid crystal display device 26. That is to say, the rendering image 261HSA(S), in which the tire portions of the wheel images 263SFL and 263SBL are displayed to be lighted, is displayed. In addition, the indicator lamp 240HSA turns to the lighted state as shown in an indicator display content column corresponding to the state column of the vehicle stop in FIG. 17.

Next, as shown in FIG. 16, when the driver releases the brake pedal 16 at a time t4 while the automobile V is stopped on the uphill by the braking of the driver, the holding operation of the brake fluid pressure by the driving support control HSA is started. In such a way, the brake fluid pressure is held for a period (for example, 2 [s] at the maximum) from a time t4 to a time t5, and such a stopped state of the automobile V is held. Moreover, the BHS information, which indicates that the brake pedal 16 is in a released state, is transmitted from the driving support device 40 through the communication network 50 to the display controller 30.

Based on the received operation flag HSA and BHS information, the input processing unit 300A determines that the brake pedal 16 has turned to the released state during the operation of the driving support control HSA. In such a way, the input processing unit 300A generates the display start instruction HSA(O) for the rendering image 261HSA(O) and the blinking display instruction for the indicator lamp 240HSA. Moreover, the input processing unit 300A transmits the rendering display instruction for HSA, which includes the generated display start instruction HSA(O) and blinking display instruction, to the meter device 20 through the communication network 50.

Meanwhile, the meter controller 28 of the meter device 20 receives the rendering display instruction for HSA, which comes from the input processing unit 300A and includes the display start instruction HSA(O) and the blinking display instruction. Based on the received rendering display instruction for HSA, the meter controller 28 reads out information on the rendering image 261HSA(O), which corresponds to the display start instruction HSA(O), from the rendering image storage memory 29. Moreover, the meter controller 28 acquires the variety of information, which is to be displayed on the first display region 260A, second display region 260B and fourth display region 260D of the display screen 260, through the communication network 50 from the other controllers, instruments and the like. Then, the meter controller 28 generates an image display signal HSA(O) of the image, which is to be displayed on the display screen 260, based on the readout information on the rendering image HSA(O) and the acquired variety of information, and inputs the generated image display signal HSA(O) to the liquid crystal display device 26. Simultaneously, the meter controller 28 inputs the blinking display instruction for the indicator lamp 240HSA to the indicator 24b of the second meter 24.

In such a way, as shown in a liquid crystal display screen column corresponding to a state column of brake fluid pressure holding in FIG. 17, the rendering image 261HSA (O) is displayed on the display screen 260 of the liquid crystal display device 26. That is to say, in the rendering image 261HSA(O), the tire portions of the wheel images 263SFL and 263SBL are displayed to blink. In addition, indicator lamp 240HSA is displayed to blink as shown in an indicator display content column corresponding to the state column of the vehicle brake fluid pressure holding in FIG. 17.

Subsequently, as shown in FIG. 16, when the driver depresses the accelerator pedal (not shown) at a time t5, the driving support control HSA comes not to operate, and the brake fluid pressure becomes 0. That is to say, the operation flag HSA turns to the OFF state, and the operation flag HSA in the OFF state and the other operation flags in the OFF state are transmitted from the driving support device 40 through the communication network 50 to the display controller 30. In such a way, the input processing unit 300A determines that the driving support control HSA is not operating. Moreover, the output signal processing unit 300D determines that all of the operation flags are in the OFF state, and implements the display control processing for the default image 261DF. In such a way, as shown in a liquid crystal display screen column corresponding to a state column of vehicle start in FIG. 17, the default image 261DF is displayed on the display screen 260 of the liquid crystal display device 26. In addition, since the operation flag HSA turns to the OFF state, the indicator lamp 240HSA turns to the extinguished state as shown in an indicator display content column corresponding to the state column of the vehicle start in FIG. 17.

Here, in this embodiment, a function of the display controller 30, which is to determine the operation state of the driving support control based on the operation flag, corresponds to an operation state determination unit. A function of the display controller 30, which is to display the support state displaying image, corresponds to a display control unit. A function in the input processing unit 300A, which is to detect the steering direction, corresponds to a steering angle detection unit.

Moreover, in this embodiment, the mesh images 261a, 261e and 261h, the left-side effect display regions AL1 to AL4, the right-side effect display regions AR1 to AR4 and the effect display region 265 correspond to the background image. In addition, the left curve mesh image 261c (including the effect display regions 264LL and 264RL) and the right curve mesh image 261d (including the effect display regions 264LR and 264RR) correspond to the background image.

Effects of First Embodiment

In accordance with this embodiment, it becomes possible to exert the effects to be described below.

(1) The display controller 30 detects the operation state of the driving support control implemented by the automotive driving support device 40. The display controller 30 displays the support state displaying image, which is an image having a configuration in which the vehicle image 261b is superimposed on the background image (for example, the mesh image 261a) as a planar image with a predetermined shape, on the liquid crystal display device 26 provided in the meter panel 21 of the meter device 20. Upon having determined that the driving support control is activated, the display controller 30 performs the display control to change the display mode of the mesh image 261a of the support state displaying image, which is to be displayed on the liquid crystal display device 26, to the preset display mode.

The display mode of the background image (for example, mesh image 261a) is changed, whereby the driver is notified of the activation of the driving support device 40. That is to say, the display mode of not the minute part portions of the vehicle image 261b but the image (for example, the mesh image 261a) of the background portion is changed, and accordingly, it becomes possible for the driver to grasp the change of the display content by the instantaneous movement of the line of sight and by the peripheral visual field without gazing the display content. In such a way, even in the situation where the driving load is large, it becomes possible to accurately notify the driver that the driving support control is operating without annoying the driver.

(2) The background image is configured to include the mesh image 261a, which is a mesh-like planar image and the gradation images (for example, the display effect regions 264LL to 264RR, and 265). In such a way, it becomes possible to display the operation state of the driving support control by the change of the display mode of the mesh-like planar image, the gradation image or the like. As a result, it becomes possible to perform image display which further facilitates the driver to grasp the change of the display content.

(3) The vehicle image 261b is set to be an image from a viewpoint of looking down the vehicle from the upper rear of the vehicle concerned. The background image (mesh image 261*a*) is set to be an image with a shape, which is extended in the far and near direction while defining the vehicle longitudinal direction of the vehicle image 261*b* as the far and near direction, and has a wider width in the direction perpendicular to the far and near direction toward the near side and a narrower width therein toward the far side.

In such a way, a composition in which the vehicle travels toward the far side on the background image is formed, and it becomes possible to make display in a display mode in which the background image is likened to a road, for example, by deforming the background image into a shape curved in the turning direction of the vehicle. Hence, even in the situation where the driving load is relatively large, it becomes possible to accurately notify the driver that the driving support control is operating further without annoying the driver.

(4) Upon having determined that the driving support control is activated, the display controller 30 performs the display control to change the display color of the portion of the background image (mesh image 261*a*) within a distance range, which is preset from the vehicle image 261*b* of the support state displaying image, to the preset display color.

That is to say, by the change of the display color of such a background image portion, the driver is notified that the driving support control is operating, and accordingly, it becomes possible for the driver to easily grasp the change of the display content by the instantaneous movement of the line of sight and by the peripheral visual field without gazing the display content. In such a way, it becomes possible for the driver to easily recognize that the driving support control is operating without gazing the display content.

(5) The display controller 30 determines whether or not at least one of the driving support control (ATC), which is configured to be activated while the automobile V is traveling along the curved road and to control the respective wheels of the vehicle to reduce the delay of the yaw rate, and the driving support control (AEB), which is to add the deceleration to the vehicle to reduce the driving load at the time of traveling along the curved road, is activated. Upon having determined that the at least one driving support control is activated, the display controller 30 performs the display control to change the shape of the background image (mesh image 261*a*) of the support state displaying image, which is to be displayed on the liquid crystal display device 26, to a curve shape (left curve mesh image 261LC, right curve mesh image 261RC) curved in the steering direction that is based on the steering angle θs detected by the steering angle sensor 3.

That is to say, with regard to the driving support control in which the operation scene is definite, for example, while the automobile V is traveling along the curved road, the background image portion is changed to the shape matched with the operation scene in addition to the change of the display color on the periphery of the vehicle mage. In such a way, it becomes possible for the driver to more easily grasp the change of the display content by the instantaneous movement of the line of sight and by the peripheral visual field without gazing the display content. Hence, it becomes possible for the driver to more easily recognize that the driving support control is operating without gazing the display content.

(6) The display controller 30 superimposes and displays the images (wheel images 263FL, 263FR, 263BL and 263BR) with the wheel shape on the wheel positions in the vehicle image 261*b* of the support state displaying image while the driving support controls (ATC, AEB) activated during the turning operation of the automobile V are operating. The display controller 30 performs the display control to display the wheel images 263FL, 263FR, 263BL and 263BR by the preset display color exerting the display effect that allows the wheel images 263FL, 263FR, 263BL and 263BR to look like emitting light.

That is to say, after the intervention of the driving support control (ATC or AEB) activated while the automobile V is traveling along the curved road, the wheel images 263FL, 263FR, 263BL and 263BR are subjected to the four wheel light emission display (control intervening-type display image 261IN is displayed). In such a way, in the situation where the driving load is relatively small before the automobile V approaches the curved road, the driver visually recognizes the display content subjected to the four wheel lighting display, and can thereby get to know that the control intervenes. Thereafter, in the situation where the driving load is relatively large, for example, during the turning operation, the deformation display and the light emission display for the background image are performed, and accordingly, it becomes possible for the driver to easily grasp the change of the display content by the instantaneous movement of the line of sight and by the peripheral visual field without gazing the display content. Hence, it becomes possible for the driver to more easily recognize that the driving support control is operating without gazing the display content.

(7) Upon having determined that the driving support control (SMB), which is activated while the automobile V is traveling on the straight road, and is to enhance the traveling stability with respect to the steering angle, is activated, the display controller 30 changes the shape of the background image (mesh image 261*a*) of the support state displaying image, which is to be displayed on the liquid crystal display device 26, to the halfpipe-shaped image (mesh image 261*h*), in which both ends of the background image (mesh image 261*a*) in the direction perpendicular to the far and near direction are lifted up, and the walls surrounding the crosswise side surfaces of the vehicle image 261*b* are formed. The display controller 30 divides the image portions of the mesh image 261*h*, which are placed within the preset distances ranges from the vehicle image 261*b*, into the plurality of regions in the direction perpendicular to the far and near direction. With regard to the plurality of divided regions (left-side effect display regions AL1 to AL4, right-side effect display regions RL1 to RL4), the display controller 30 performs the display control to change the present display color thereof to the other preset colors sequentially from the divided regions on the near side to the vehicle image 261*b* to the divided regions on the far side therefrom.

That is to say, by the animation display by the change of the display color, such rendering display in which the walls are formed step by step on both sides of the vehicle image is performed. In such a way, the driver can easily grasp the change of the display content by the peripheral visual field without gazing the display content, and in addition, it becomes possible for the driver to easily recognize which type of the driving support controls is activated.

(8) The display controller 30 performs the display control to change the display color of the background image portion within the distance range, which is preset from the vehicle image 261*b*, to the preset display color exerting the display effect that allows the background image portion to look like emitting light.

That is to say, the image portion within the distance range preset from the vehicle image in the background image is changed to the color (for example, high-brightness or high-lightness color in comparison with the color of the other region) exerting the display effect that allows the image portion to look like emitting light. In such a way, the driver can easily grasp the change of the display content by the peripheral visual field without gazing the display content, and accordingly, it becomes possible for the driver to easily grasp that the driving support control is operating.

(9) Upon having determined that the driving support control 40 is operating, the display controller 30 performs the display control to display the support state displaying image, which is the image for notifying the driver that the driving support control is operating, on the liquid crystal display device 26. Moreover, the display controller 30 performs the display control to display the support state displaying image on the liquid crystal display device 26 continuously at least until the preset minimum display time tmin elapses.

Here, the operation time of the driving support control is various, and depending on the operation situation, the driving support control operates only for a short time. If the support state displaying image is displayed only for a short time for such a driving support control that operates for a relatively short time, then the support state displaying image is displayed momentarily. Such display becomes display from which the driver cannot recognize a content thereof, the display annoying the driver.

That is to say, the minimum display time tmin is set, for example, at a time appropriate for allowing the driver to recognize the display content, and the display of the support state displaying image is performed continuously at least until the minimum display time tmin elapses. In such a way, it becomes possible for the driver to recognize which type of the driving support controls is activated without feeling annoyed.

(10) The display controller 30 performs the display control to continuously display the support state displaying image, which corresponds to the operating driving support control, on the liquid crystal display device 26 while the driving support control concerned is operating, and in addition, to continue to display the support state displaying image, which corresponds to the operating driving support control, on the liquid crystal display device 26 until the minimum display time tmin elapses upon having determined that the operating driving support control is ended before the elapse of the preset minimum display time tmin. In such a way, it becomes possible for the driver to recognize which type of the driving support controls is activated without feeling annoyed.

(11) The minimum display time tmin is set for each type of the driving support controls. The minimum display time tmin is set for each of the driving support controls, whereby, for example, with regard to the driving support control with a relatively large driving load, it becomes possible to adopt such a flexible display mode, for example, of enhancing the visibility by extending the display time of the support state displaying image.

(12) The display controller 30 detects the operation state of the driving support control implemented by the automotive driving support device 40. Upon having determined that the driving support control is activated, the display controller 30 performs the display control to display the support state displaying image, which is the image for notifying the driver that the driving support control is activated, on the display device. Upon having determined that the driving load at the time of having determined that the driving support control is activated is relatively large, the display controller 30 performs the display control to display such a high load-time support state displaying image with the composition in which a first vehicle image (vehicle image 261*b* and the like) viewed from the viewpoint of looking down the vehicle from the upper rear is superimposed on the background image (for example, the mesh image 261*a*), and in addition, to display the background image portion in the preset display mode. Upon having determined that the driving load at the time of having determined that the driving support control is activated is relatively small, the display controller 30 performs the display control to display such a low load-time support state displaying image (rendering image 261HSA or 261HDC) including a second vehicle image (vehicle image 261*f* or 261*h*) obtained by viewing the side surface of the vehicle from front in the drawing, and in addition, to display wheel portions of the second vehicle image in the preset display mode.

For example, when the vehicle velocity of the automobile V is relatively high, the automobile V performs the turning operation, the automobile V gets over the irregularities which give a large input, and so on, there occur the situations where the driving load is relatively large. In such situations as described above, it becomes difficult for the driver to gaze the display screen of the liquid crystal display device 26, and to recognize the detailed display content thereon. Meanwhile, when the automobile V is stopped on the way of the uphill with a steep gradient, and starts from such a stopped state, the automobile V travels on the downhill with a steep gradient, the snowy road and the like at a relatively low vehicle velocity, and so on, there occur situations where the driving load is relatively small. In such situations as described above, it becomes relatively easy for the driver to see the display screen 260 of the liquid crystal display device 26 and to recognize the display content thereon.

Accordingly, in the case where the driving load at the time when the driving support control is activated is relatively large, the high load-time support state displaying image, which includes the first vehicle image viewed from the viewpoint of looking down the vehicle from the upper rear, and has the composition in which the first vehicle image is arranged on the background image (mesh-like planar image) is displayed. In addition, the background image portion is displayed in the preset display mode, for example, by performing the light emission display for the background image portion on the periphery of the first vehicle image. In such a way, it becomes possible for the driver to recognize that the driving support control is operating by the instantaneous movement of the line of sight and by the peripheral visual field without gazing the display screen 260 of the liquid crystal display device 26.

Meanwhile, in the case where the driving load at the time when the driving support control is activated is relatively small, the low load-time support state displaying image including the second vehicle image in which the side of the vehicle is viewed from front in the drawing is displayed, and the wheel image portions are displayed in the preset display mode, for example, by performing the light emission display or the blinking display for the tire portions of the wheel images in the second vehicle image. In such a way, it becomes possible for the driver to recognize the relatively detailed operation situation of the driving support control from the display content of the display screen 260 of the liquid crystal display device 26.

(13) The driving support control includes a time difference-type driving support control, which is activated in a standby state when a first preset condition is established (for example, when the automobile V is stopped in a state where the driver depresses the brake pedal 16), and shifts to a control execution state when a preset second condition is established (when the driver releases the brake pedal 16) in the standby state. Upon having determined that such a driving load at a time of having determined that the time difference-type driving support control (for example, the driving support control HSA) is activated in the standby state is relatively small, the display controller 30 performs the display control to display such a low load-time support state displaying image, and in addition, to display the wheel portions of the second vehicle image in the low load-time support state displaying image by the display color exerting the display effect that allows the tire portions to look like emitting light (for example, the rendering image 261HSA(S) is subjected to the wheel lighting display). Upon having determined that the such a driving load at a time of having determined that the time difference-type driving support control shifts from the standby state to the operation state is relatively small, the display controller 30 performs the display control to alternately repeat the display of the wheel portions of the second vehicle image in the low load-time support state displaying image by the display color exerting the display effect that allows the wheel portions to look like emitting light and the display of the wheel portions concerned by the display color exerting the display color that allows the wheel portions to look like being extinguished (for example, the rendering image 261HSA(O) is subjected to the wheel blinking display).

In such a way, it becomes possible to perform information display with high visibility for such a driving support control, which turns to the standby state (activation preparation state) when the brake pedal 16 is depressed and the automobile V is stopped, and thereafter, turns to the operation state by the release of the brake pedal 16, for example, like the driving support control HSA that is activated in the situation where the driving load is relatively small.

(14) Such a low load-time support state displaying image (rendering image 261HSA or 261HDC), which corresponds to the driving support control (driving support controls HSA, HDC and the like) activated on the slope, is allowed to have a configuration, which includes a slope display line (uphill display line 266 or downhill display line 267) that is an inclination line indicating the slope, in which the second vehicle image (vehicle image 261*f* or 261*h*) is arranged so that the slope display line can be set to be a ground plane of the tire portions of the second vehicle image. In such a way, it becomes possible for the driver to easily recognize that the driving support control to be active on the slope is operating by seeing the display screen 260 of the liquid crystal display device 26.

Second Embodiment

Figure 18:
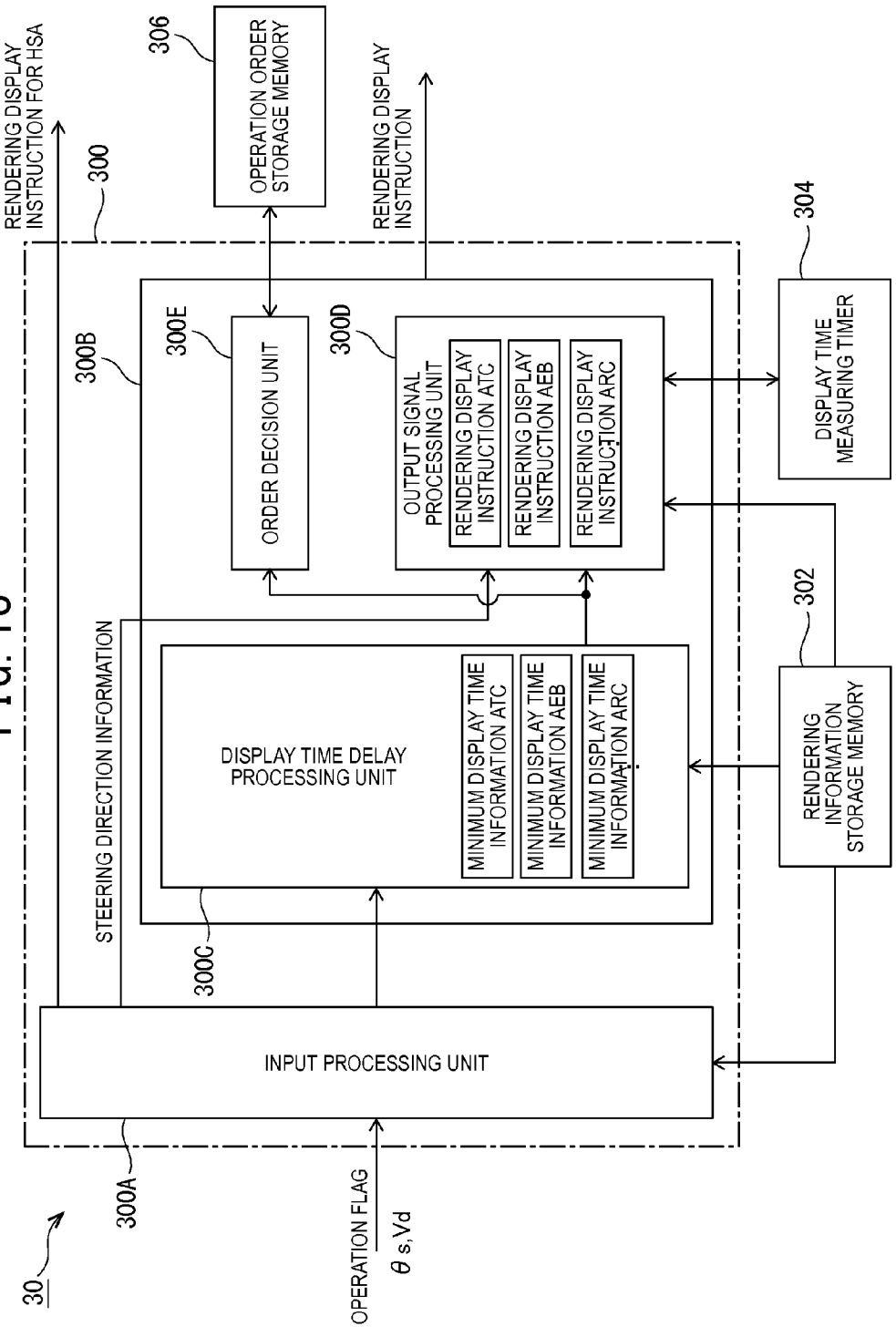
FIG. 18 is a block diagram showing a configuration of a display controller 30 of a second embodiment.
Figure 19:
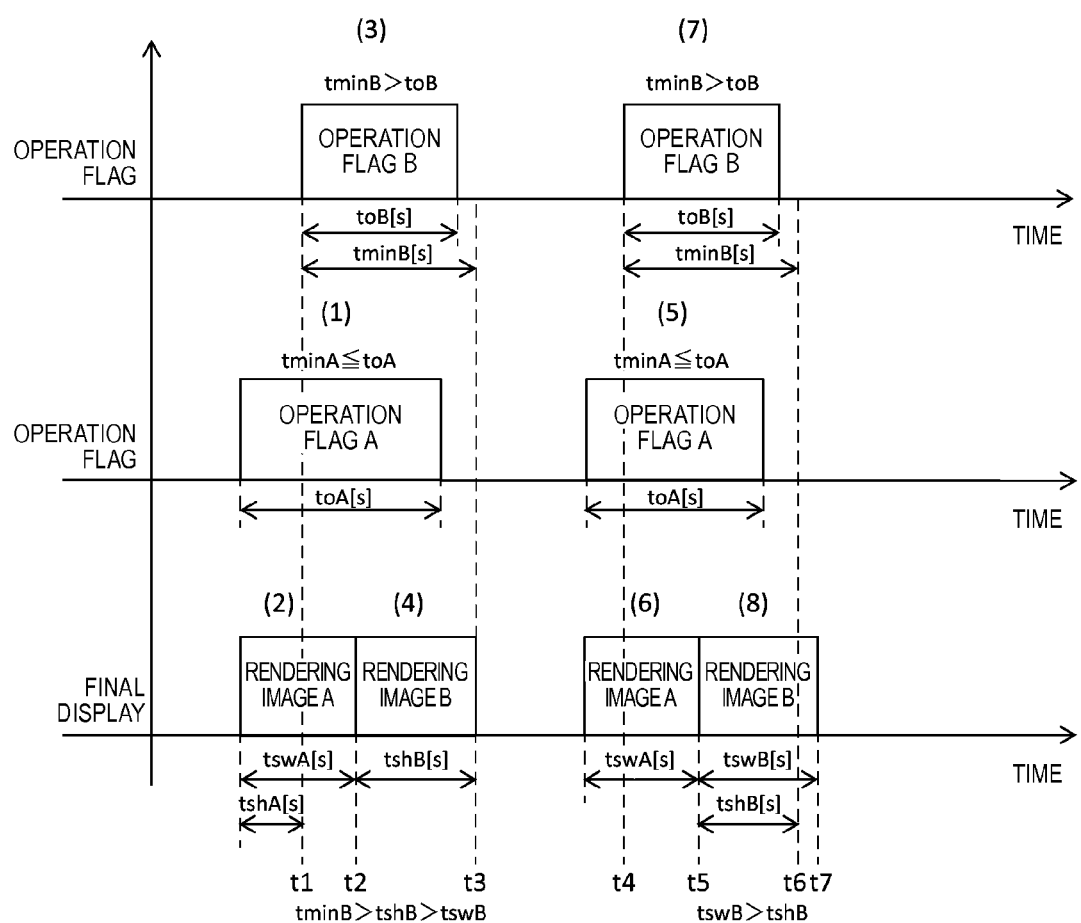
FIG. 19 is a time chart for explaining an example of a display control operation in a case where the driving support controls are activated while being superimposed continuously on each other.
Figure 20:
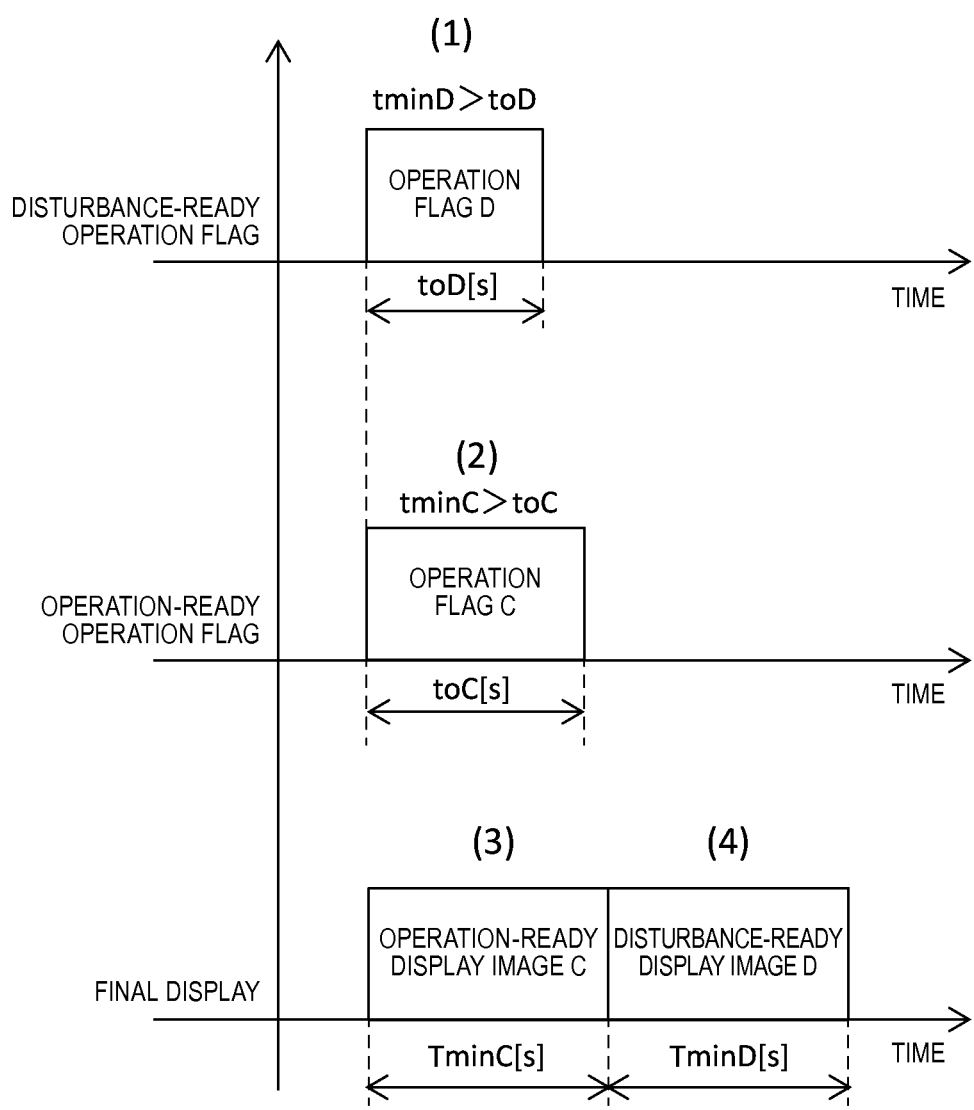
FIG. 20 is a time chart for explaining an example of a display control operation in a case where an operation-ready driving support control and a disturbance-ready driving support control are activated simultaneously.

Next, a description is made of a second embodiment of the present invention based on the drawings. FIG. 18 to FIG. 20 are views showing an embodiment of a display control device for a vehicle and a display control method for a vehicle according to the second embodiment of the present invention.
(Configuration)
In the above-described first embodiment, such a configuration is adopted, in which, in the case where other driving support control is activated during an operation of a certain driving support control, the first support state displaying image under display is immediately switched to the second support state displaying image corresponding to the subsequently activated driving support control, and the second support state displaying image is displayed. In contrast, in this embodiment, when it is determined that the display time of the previously displayed first support state displaying image has not elapsed for more than a preset switching display time, the display of the first support state displaying image is displayed continuously until the switching display time elapses. The second embodiment is different from the above-described first embodiment in that the second support state displaying image is thereafter displayed. Note that the same reference numerals are assigned to similar configurations to those of the above-described first embodiment, and a duplicate description thereof is omitted.

FIG. 18 is a block diagram showing a configuration of a display controller 30 of this embodiment. As shown in FIG. 18, the display controller 30 of this embodiment includes: a display controlling ECU 300; a rendering information storage memory 302; a display time measuring timer 304; and an operation order storage memory 306.

The operation order storage memory 306 is a memory that stores an operation order of the driving support controls. The display controlling ECU 300 has a configuration including an input processing unit 300A and a display control unit 300B. Moreover, in this embodiment, the display control unit 300B has a configuration including a display time delay processing unit 300C, an output signal processing unit 300D, and an order decision unit 300E.

Upon having determined that the driving support control is operating based on the inputted operation flag, the display time delay processing unit 300C reads out the minimum display time information, which corresponds to the driving support control determined to be operating, from the rendering information storage memory 302. Then, the display time delay processing unit 300C inputs the minimum display time information to the output signal processing unit 300D, and inputs the inputted operation flag to the order decision unit 300E.

The order decision unit 300E stores the operation order of the driving support controls in the operation order storage memory 306 based on the operation flag inputted from the display time delay processing unit 300C. Then, based on the stored operation order, the order decision unit 300E decides the display order of the support state displaying images corresponding to the respective driving support controls.

In this embodiment, in a case where only one driving support control is operating, and in a case where any of the driving support controls is not operating, the order decision unit 300E inputs information, which indicates matters of these cases, to the output signal processing unit 300D.

Moreover, in a case where two types or more of the driving support controls are activated continuously in an overlapping manner, the order decision unit 300E defines the operation order, which is stored in the operation order storage memory 306, as a display order, and inputs information on the display order to the output signal processing unit 300D.

Furthermore, in a case where two types or more of the driving support controls are activated simultaneously, the order decision unit 300E decides the display order in response to the operation conditions of the driving support controls. The order decision unit 300E inputs information on the decided display order to the output signal processing unit 300D.

Here, for example, the operation conditions of the driving support controls include: those established in response to that the driver operates a driving operator such as the steering wheel 1; those established in response to an input of a disturbance; and the like. In this embodiment, as such driving support control in which the operation conditions are established in response to the operation of the driving operator, for example, the driving support controls ATC and AEB, which are activated in response to the operation of the steering wheel 1, are applicable. Meanwhile, in this embodiment, as such driving support control in which the operation conditions are established in response to the input of the disturbance, for example, the driving support control ARC, which is activated in response to the getting over (input) of the irregularities (disturbance) of the road surface, and the like are applicable.

In this embodiment, in a case where such an operation-ready driving support control as a driving support control, in which the control intervenes in response to the operation of the driving operator by the operator, and a disturbance-ready driving support control as a driving support control, in which the control intervenes in response to the input of the disturbance, are activated simultaneously, then priority is given to the operation-ready driving support control. That is to say, the order decision unit 300E decides the display order of the support state displaying image, which corresponds to the operation-ready driving support control, to a previous order to the display order of the support state displaying image, which corresponds to the disturbance-ready driving support control.

Next, in the case where two types or more of the driving support controls are activated continuously in an overlapping manner, the output signal processing unit 300D of this embodiment performs the display control based on the switching display time tsw preset for each type of the driving support controls. In this embodiment, the switching display time tsw is set at a time shorter than the minimum display time tmin described in the above-described first embodiment. For example, in a case where the minimum display time tmin is set at 2.5 [s], the switching display time tsw is set, for example, at 2.0 [s] and the like. That is to say, while the minimum display time tmin is a time for enhancing the recognizability of the driver for the display content, this switching display time tsw is a time for resolving such annoyance, which is given to the driver, by the display switching in a short time. Specifically, in the above-described first embodiment, the support state displaying image, which corresponds to the driving support control subsequently started to be activated, is displayed after being immediately switched from the previously displayed support state displaying image. At this time, in a case where the display time of the previously displayed support state displaying image is extremely short, the previous support state displaying image is displayed at a moment, and thereafter, the subsequent support state displaying image is displayed. Therefore, the driver cannot recognize what was displayed, and feels annoyed.

In this embodiment, by the display time measuring timer 304, the output signal processing unit 300D measures a display time of a support state displaying image (hereinafter, referred to as a first support state displaying image), which corresponds to the driving support control (hereinafter referred to as a first driving support control) previously started to activated. Based on the display time thus measured, the output signal processing unit 300D determines whether or not the display time of the first support state displaying image has elapsed for more than the switching display time tsw (hereinafter, referred to as a first switching display time tsw1) preset for the first driving support control. In a case of having determined that the switching display time tsw1 has not elapsed by such a determination, the output signal processing unit 300D performs the display control to display the support state displaying image continuously until the first switching display time tsw1 elapses.

Subsequently, the output signal processing unit 300D performs the display control to display a support state displaying image (hereinafter, referred to as a second support state displaying image), which corresponds to the driving support control (hereinafter, referred to as a second driving support control) subsequently started to activated, on the liquid crystal display device 26. Also at this time, the output signal processing unit 300D measures the display time by the display time measuring timer 304. Then, based on the time thus measured, the output signal processing unit 300D of this embodiment performs the display control to display the second support state displaying image at least until a switching display time tsw (hereinafter, referred to as a second switching display time tsw2) preset for the second driving support control elapses.

A description is made below of the display control for the second support state displaying image. First, a description is made of a case where the operation time of the second driving support control is the minimum display time tmin or less. In this case, it is further assumed that, with respect to the time from when the second driving support control is activated until the minimum display time tmin elapses, a time (hereinafter, referred to as a second display time tsh2) from when the second driving support control is activated until the minimum display time tmin elapses is shorter than the second minimum display time tsw2. In this case, the output signal processing unit 300D performs the display control to display the second support state displaying image continuously until the second switching display time tsw2 elapses.

Meanwhile, in a case where the second display time tsh2 is a time equal to or more than the second switching display time tsw2, then in this embodiment, output signal processing unit 300D performs the display control to display the second support state displaying image until the second display time tsh2 elapses.

Next, a description is made of a case where the operation time of the second driving support control becomes longer than the minimum display time tmin, and the display time of the second support state displaying image becomes longer than the second switching display time tsw2. Also in this embodiment, in a similar way to the above-described first embodiment, the display control to continuously display the support state displaying image corresponding to the driving support control that is operating is performed during the operation of the driving support control. Hence, the output signal processing unit 300D performs the display control to display the second support state displaying image continuously until the second driving support control is ended.

Note that the configuration here is not limited to the configuration of displaying the second support state displaying image for at least the second switching display time tsw2 or more, and a configuration may be adopted, in which at least the second support state displaying image is displayed, and thereafter, is continuously displayed until the minimum display time preset for the second driving support control elapses.

Moreover, the switching display time tsw is set in a similar way also for the default image. For example, it is assumed that another driving support control is activated before the switching display time tsw preset for the default image elapses after the display returns to the default image after the end of a certain driving support control. In this case, the output signal processing unit 300D displays the default image continuously until the switching display time tsw preset for the default image elapses.

Moreover, in this embodiment, the information on the switching display time is included in the display pattern information stored in the rendering information storage memory 302.

Meanwhile, in a case where the operation-ready driving support control and the disturbance-ready driving support control are activated simultaneously, the output signal processing unit 300D performs the display control based on the display order inputted from the order decision unit.

In this embodiment, the display order is decided so that priority can be given to the operation-ready driving support control, and accordingly, the output signal processing unit 300D previously performs the display control for a support state displaying image (hereinafter, referred to as an operation-ready display image) corresponding to the operation-ready driving support control. Specifically, first, the output signal processing unit 300D performs the display control to display the operation-ready display image until the minimum display time preset for the operation-ready driving support control elapses. Thereafter, the output signal processing unit 300D implements the display control for a support state displaying image (hereinafter, referred to as a disturbance-ready display image) corresponding to the disturbance-ready driving support control. Specifically, in this embodiment, the output signal processing unit 300D performs the display control to display the disturbance-ready display image until the minimum display time preset for the disturbance-ready driving support control elapses.

(Operations)

A description is made below of operation examples of this embodiment based FIG. 19 and FIG. 20.

[Display Control Operation at Continuous Operation Time]

Based on FIG. 19, a description is made of the case where the driving support controls are activated continuously in an overlapping manner. FIG. 19 is a time chart for explaining an example of the display control operation in the case where the driving support controls are activated continuously in an overlapping manner.

First, as shown in (1) in FIG. 19, when the operation flag of the driving support control A turns to the ON state, the display time delay processing unit 300C reads out a minimum display time tminA, which corresponds to the driving support control A, as the minimum display time information from the rendering information storage memory 302. Note that, in this embodiment, the driving support control A is any one control of the driving support controls ATC, AEB, ARC, SMB and HDC.

The display time delay processing unit 300C inputs the readout minimum display time tminA to the output signal processing unit 300D. Moreover, the display time delay processing unit 300C inputs the inputted operation flag to the order decision unit 300E.

The order decision unit 300E stores the operation order of the driving support controls in the operation order storage memory 306 based on the inputted operation flag. As shown in (1) in FIG. 19, the driving support control A is first activated, and accordingly, the order decision unit 300E stores information on an operation order (first order) of the driving support control A in the operation order storage memory 306. Then, the order decision unit 300E inputs display order information, which indicates that the driving support control A is operating, to the output signal processing unit 300D.

Upon having determined that the driving support control A has turned to the operation state based on the information on the display order, which is inputted from the order decision unit 300E, the output signal processing unit 300D reads out display pattern information A, which corresponds to the driving support control A, from the rendering information storage memory 302. Then, based on the readout display pattern information A, the output signal processing unit 300D generates a display start instruction A for the support state displaying image X (hereinafter, referred to as a rendering image A) corresponding to the driving support control A. Moreover, the output signal processing unit 300D transmits the generated display start instruction A to the meter device 20 through the communication network 50. Meanwhile, the output signal processing unit 300D outputs the start instruction for the counting operation to the display time measuring timer 304, and starts the counting operation (measurement of the display time) by the display time measuring timer 304.

Meanwhile, upon having received the display start instruction A from the output signal processing unit 300D, the meter controller 28 of the meter device 20 reads out the information on the rendering image A, which corresponds to the received display start instruction A, from the rendering image storage memory 29. Furthermore, the meter controller 28 acquires the variety of information, which is to be displayed on the first display region 260A, the second display region 260B and the fourth display region 260D, through the communication network 50 from other controllers, instruments and the like. Then, the meter controller 28 generates the image display signal A of the image, which is to be displayed on the display screen 260, based on the readout information on the rendering image A and the acquired variety of information, and inputs the generated image display signal A to the liquid crystal display device 26.

As shown in (2) in FIG. 19, the liquid crystal display device 26 displays the rendering image A on the display screen 260 based on the image display signal A inputted thereto.

Subsequently, as shown in (3) in FIG. 19, when the operation flag B of the driving support control B turns to the ON state during the operation of the driving support control A, the display time delay processing unit 300C reads out a minimum display time tminB, which corresponds to the driving support control B, as the minimum display time information from the rendering information storage memory 302. Then, the display time delay processing unit 300C inputs the readout minimum display time tminB to the output signal processing unit 300D. Moreover, the display time delay processing unit 300C inputs the inputted operation flag to the order decision unit 300E.

The order decision unit 300E stores information on an operation order (second order) of the driving support control B in the operation order storage memory 306 based on the inputted operation flag. Then, based on the stored information on the operation orders, the order decision unit 300E inputs display order information, which indicates that the driving support control A is the first and that the driving support control B is the second, to the output signal processing unit 300D.

Upon having determined that the driving support control B has turned to the operation state during the operation of the driving support control A based on the information on the display order, which is inputted from the order decision unit 300E, the output signal processing unit 300D reads out display pattern information B, which corresponds to the driving support control B, from the rendering information storage memory 302.

Meanwhile, based on the count value of the display time measuring timer 304, the output signal processing unit 300D determines whether or not the display time of the driving support control A has elapsed for more than the switching display time tswA preset for the driving support control A. As shown in (2) and (3) in FIG. 19, at a point of time when the driving support control B is activated, the display time (tshA in FIG. 19) of the rendering image A is shorter than the switching display time tswA. Therefore, the output signal processing unit 300D performs the display control to display the rendering image A continuously until the display time of the rendering image A elapses for more than the switching display time tswA. That is to say, upon having determined that the display time of the rendering image A has elapsed for more than the switching display time tswA, the output signal processing unit 300D generates a display switch instruction B for a support state displaying image B (hereinafter, referred to as the rendering image B), which corresponds to the driving support control B, based on the display pattern information B. Then, the output signal processing unit 300D transmits the generated display switch instruction B to the meter device 20 through the communication network 50. Meanwhile, the output signal processing unit 300D outputs the reset instruction to the display time measuring timer 304 and resets the count value, in addition, subsequently outputs the start instruction for the counting operation to the display time measuring timer 304, and starts the counting operation by the display time measuring timer 304.

Upon having received the display switch instruction B from the output signal processing unit 300D, the meter controller 28 of the meter device 20 reads out the information on the rendering image B, which corresponds to the received display switch instruction B, from the rendering image storage memory 29. Furthermore, the meter controller 28 acquires the variety of information, which is to be displayed on the first display region 260A, the second display region 260B and the fourth display region 260D, through the communication network 50 from other controllers, instruments and the like. Then, the meter controller 28 generates the image display signal B of the image, which is to be displayed on the display screen 260, based on the readout information on the rendering image B and the acquired variety of information, and inputs the generated image display signal B to the liquid crystal display device 26.

As shown in (4) in FIG. 19, the liquid crystal display device 26 displays the rendering image B on the display screen 260 in place of the rendering image A based on the image display signal B inputted thereto.

In the example of (1) to (4) in FIG. 19, a time when the minimum display time tminA elapses from the operation start time t1 of the driving support control B is the time t3. Then, the time from the display start time t2 of the rendering image B to the time t3, that is, the display time tshB of the rendering image B is equal to or more than a switching display time tswB preset for the driving support control B.

Hence, the output signal processing unit 300D performs the display control to display the rendering image B until the display time tshB elapses. That is to say, upon having determined that the display time of the rendering image B has elapsed for more than the display time tshB, the output signal processing unit 300D generates a display end instruction for the rendering image B. Then, the output signal processing unit 300D transmits the generated display end instruction to the meter device 20 through the communication network 50.

Upon having received the display end instruction from the output signal processing unit 300D, the meter controller 28 of the meter device 20 reads out the information on the default image 261DF from the rendering image storage memory 29. Moreover, the meter controller 28 acquires the variety of information, which is to be displayed on the above-described first display region 260A, second display region 260B and fourth display region 260D, through the communication network 50 from other controllers, instruments and the like. Then, the meter controller 28 generates the image display signal DF of the image, which is to be displayed on the display screen 260, based on the readout information on the default image 261DF and the acquired variety of information, and inputs the generated image display signal DF to the liquid crystal display device 26.

The liquid crystal display device 26 displays the default image 261DF on the display screen 260 in place of the rendering image B based on the image display signal DF inputted thereto.

Next, a description is made of the operation example shown in (5) to (8) in FIG. 19. A difference of (5) to (8) in FIG. 19 from (1) to (4) in FIG. 19 is that a start time of the driving support control B is early. Therefore, with respect to a time t6 at a point of time when the minimum display time tminB elapses from an activation time t4 of the driving support control B, such a time (display time tshB) from the a display start time t5 of the rendering image B to the time t6 is shorter than the switching display time tswB.

In such a case, the output signal processing unit 300D performs the display control to display the rendering image B continuously until the switching display time tswB elapses from the display start time t5, that is, from the time t5 to a time t7.

[Display Control Operation at Operation Time of Plural Controls]

Next, based on FIG. 20, a description is made of a case where the operation-ready driving support control and the disturbance-ready driving support control are activated simultaneously. FIG. 20 is a time chart for explaining an example of a display control operation in the case where the operation-ready driving support control and the disturbance-ready driving support control are activated simultaneously.

Note that, hereinafter, an operation flag of the operation-ready driving support control is referred to as an operation-ready operation flag, and an operation flag of the disturbance-ready driving support control is referred to as a disturbance-ready operation flag.

As shown in (1) and (2) in FIG. 20, it is assumed that an operation-ready operation flag C and a disturbance-ready operation flag D have turned to the ON state simultaneously. In this case, the display time delay processing unit 300C reads out a minimum display time tminC, which corresponds to an operation-ready driving support control C, as the minimum display time information from the rendering information storage memory 302. Moreover, the display time delay processing unit 300C reads out a minimum display time tminD, which corresponds to a disturbance-ready driving support control D, as the minimum display time information from the rendering information storage memory 302. Note that, in this embodiment, the operation-ready driving support control C is either one control of the driving support controls ATC and AEB. Moreover, in this embodiment, the disturbance-ready driving support control D is the driving support control ARC.

The display time delay processing unit 300C inputs the readout minimum display time tminC and minimum display time tminD to the output signal processing unit 300D.

Moreover, the display time delay processing unit 300C inputs the inputted operation flags to the order decision unit 300E.

The order decision unit 300E stores the operation order of the driving support controls in the operation order storage memory 306 based on the inputted operation flags. In this case, the operation-ready driving support control and the disturbance-ready driving support control are activated simultaneously, the order decision unit 300E stores operation order information, which indicates that the operation-ready driving support control C and the disturbance-ready driving support control D are activated simultaneously, in the operation order storage memory 306. Moreover, based on the stored operation order information, the order decision unit 300E generates display order information, in which the operation-ready driving support control C is set to the first order, and the disturbance-ready driving support control D is set to the second order, and inputs the generated display order information to the output signal processing unit 300D.

Based on the information on the display order, which is inputted from the order decision unit 300E, the output signal processing unit 300D reads out display pattern information C, which corresponds to the operation-ready driving support control C, from the rendering information storage memory 302. Then, based on the readout display pattern information C, the output signal processing unit 300D generates a display start instruction C for the support state displaying image C (hereinafter, referred to as a rendering image C) corresponding to the operation-ready driving support control C. Moreover, the output signal processing unit 300D transmits the generated display start instruction C to the meter device 20 through the communication network 50. Meanwhile, the output signal processing unit 300D outputs the start instruction for the counting operation to the display time measuring timer 304, and starts the counting operation by the display time measuring timer 304.

Meanwhile, upon having received the display start instruction C from the output signal processing unit 300D, the meter controller 28 of the meter device 20 reads out the information on the rendering image C, which corresponds to the received display start instruction C, from the rendering image storage memory 29. Furthermore, the meter controller 28 acquires the variety of information, which is to be displayed on the first display region 260A, the second display region 260B and the fourth display region 260D, through the communication network 50 from the other controllers, instruments and the like. Then, the meter controller 28 generates the image display signal C of the image, which is to be displayed on the display screen 260, based on the readout information on the rendering image C and the acquired variety of information, and inputs the generated image display signal C to the liquid crystal display device 26.

As shown in (3) in FIG. 20, the liquid crystal display device 26 displays the rendering image C on the display screen 260 based on the image display signal C inputted thereto. In the example of FIG. 20, an operation time to C of the operation-ready driving support control C is shorter than the minimum display time tminC, and accordingly, even after the operation-ready driving support control C is ended, the output signal processing unit 300D performs the display control to display the rendering image C continuously until the minimum display time tminC elapses.

Specifically, upon having determined that the display time of the rendering image C has elapsed for more than the minimum display time tminC, the output signal processing unit 300D reads out display pattern information D, which corresponds to the disturbance-ready driving support control D, from the rendering information storage memory 302. Then, based on the readout display pattern information D, the output signal processing unit 300D generates a display switch instruction D for the support state displaying image D (hereinafter, referred to as a rendering image D) corresponding to the disturbance-ready driving support control D. Then, the output signal processing unit 300D transmits the generated display switch instruction D to the meter device 20 through the communication network 50. Meanwhile, the output signal processing unit 300D outputs the reset instruction to the display time measuring timer 304 and resets the count value, in addition, subsequently outputs the start instruction for the counting operation to the display time measuring timer 304, and starts the counting operation by the display time measuring timer 304.

Upon having received the display switch instruction D from the output signal processing unit 300D, the meter controller 28 of the meter device 20 reads out the information on the rendering image D, which corresponds to the received display switch instruction D, from the rendering image storage memory 29. Moreover, the meter controller 28 acquires the variety of information, which is to be displayed on the first display region 260A, the second display region 260B and the fourth display region 260D, through the communication network 50 from other controllers, instruments and the like. Then, the meter controller 28 generates the image display signal D of the image, which is to be displayed on the display screen 260, based on the readout information on the rendering image D and the acquired variety of information, and inputs the generated image display signal D to the liquid crystal display device 26.

As shown in (4) in FIG. 20, the liquid crystal display device 26 displays the rendering image D on the display screen 260 in place of the rendering image C based on the image display signal D inputted thereto.

In the example of FIG. 20, an operation time toD of the disturbance-ready driving support control D is shorter than the minimum display time tminD, and accordingly, even after the disturbance-ready driving support control D is ended, the output signal processing unit 300D performs the display control to display the rendering image D continuously until the minimum display time tminD elapses.

Specifically, upon having determined that the display time of the rendering image D has elapsed for more than the minimum display time tminD, the output signal processing unit 300D generates a display end instruction for the rendering image D. Then, the output signal processing unit 300D transmits the generated display end instruction to the meter device 20 through the communication network 50.

Upon having received the display end instruction from the output signal processing unit 300D, the meter controller 28 of the meter device 20 reads out the information on the default image 261DF from the rendering image storage memory 29. Moreover, the meter controller 28 acquires the variety of information, which is to be displayed on the above-described first display region 260A, second display region 260B and fourth display region 260D, through the communication network 50 from the other controllers, instruments and the like. Then, the meter controller 28 generates the image display signal DF of the image, which is to be displayed on the display screen 260, based on the readout information on the default image 261DF and the acquired variety of information, and inputs the generated image display signal DF to the liquid crystal display device 26.

The liquid crystal display device 26 displays the default image 261DF on the display screen 260 in place of the rendering image D based on the image display signal DF inputted thereto.

Here, in this embodiment, the function of the display controller 30, which is to determine the operation state of the driving support control based on the operation flag, corresponds to the operation state determination unit. A function in the display controller 30, which is to perform the display control for the support state displaying image, corresponds to a display control unit. The function in the input processing unit 300A, which is to detect the steering direction, corresponds to the steering angle detection unit.

Moreover, in this embodiment, the mesh images 261a, 261e and 261h, the left-side effect display regions AL1 to AL4, the right-side effect display regions AR1 to AR4 and the effect display region 265 correspond to the background image. In addition, the left curve mesh image 261c (including the effect display regions 264LL and 264RL) and the right curve mesh image 261d (including the effect display regions 264LR and 264RR) correspond to the background image.

Effects of Second Embodiment

In accordance with this embodiment, it becomes possible to exert the effects to be described below in addition to the effects of the above-described first embodiment.

(1) Upon having determined that the driving support control implemented by the automotive driving support device 40 is operating, the display controller 30 displays the support state displaying image, which is the image for notifying the driver that the driving support control is operating, on the liquid crystal display device 26 provided in the meter panel 21 of the meter device 20. Upon having determined that the second driving support control different from the first driving support control is activated while the first driving support control is operating, and upon having determined that the display time of the previously displayed first support state displaying image corresponding to the first driving support control has not elapsed for more than the preset switching display time tsw, the display controller 30 performs the display control to display the first support state displaying image continuously until the switching display time tsw elapses, and after executing the display control concerned, performs the display control to display the second support state displaying image corresponding to the second driving support control.

That is to say, when it is determined that the second driving support control is activated while the first driving support control is operating, it is determined whether or not the display time of the previously displayed first support state displaying image has elapsed for more than the switching display time tsw. Then, in a case where the display time of the previously displayed first support state displaying image has not elapsed for more than the switching display time tsw, the display control to display the second support state displaying image after immediately switching thereto is not performed, but the first support state displaying image is displayed continuously until the switching display time tsw elapses.

In such a way, even in such a case where the second driving support control is activated at timing when the first support state displaying image is displayed for an extremely short time, the first support state displaying image is displayed without fail until the switching display time tsw elapses. Hence, the switching display time tsw is set at an appropriate time, whereby it becomes possible to prevent such an extremely short-time display state of the support state displaying image from occurring, and it becomes possible to reduce the annoyance given to the driver by such display.

(2) Upon having determined that the operation-ready driving support control (for example, the driving support control ATC, AEB or the like), which is activated in response to the operation of the driving operator (steering wheel 1 brake pedal 16, accelerator pedal or the like) by the driver, and the disturbance-ready driving support control (for example, the driving support control ARC or the like), which is activated in response to the disturbance, are activated simultaneously, the display controller 30 displays the support state displaying image (rendering image 261IN, 261LC, 261RC or the like), which corresponds to the operation-ready driving support control, while giving thereto higher priority than to the disturbance-ready driving support control. Then, after the display concerned, the display controller 30 performs the display control to display the support state displaying image (rendering image 261ARC or the like) corresponding to the disturbance-ready driving support control.

The operation-ready driving support control is activated in response to the driver's operation of the driving operator, for example, such as the steering wheel 1, and accordingly, is activated under a traveling situation recognized by the driver. Meanwhile, the disturbance-ready driving support control is activated in response to the input of the disturbance, for example, such as the irregularities of the road, and accordingly, is sometimes activated under a situation that is not recognized by the driver. Hence, when the operation-ready driving support control and the disturbance-ready driving support control are activated simultaneously, the support state displaying image corresponding to the operation-ready driving support control is preferentially displayed, whereby it becomes possible to display the appropriate support state displaying image at appropriate timing.

(3) The switching display time tsw is set for each type of the driving support controls. The switching display time tsw is set for each type of the driving support controls, whereby it becomes possible to perform time setting matched with the display content, and the appropriate time is set for each of such display contents, whereby it becomes possible to perform switching display in which the annoyance is further reduced.

Modification Example (1) In the above-described embodiments, the driving support controls HSA and HDC are preset as the controls activated in the situation where the driving load is relatively small, and the driving support controls ATC, AEB, ARC and SMB are preset as the controls activated in the situation where the driving load is relatively large. Then, such a configuration is adopted, which displays the support state displaying images including the vehicle images viewed from the viewpoints different between the driving support controls, which are activated in the situation where the driving load is relatively large, and the driving support controls, which are activated in the situation where the driving load is relatively small, the support state displaying images being different in display mode at the time when the control is operating.

The present invention is not limited to this configuration. For example, upon having determined that the vehicle velocity Vd of the automobile V is a preset vehicle velocity threshold value or more based on the vehicle velocity Vd, the display controller 30 determines that the driving load is relatively large, and determines that the driving load is relatively small upon having determined that the vehicle velocity Vd is less than the vehicle velocity threshold value. Then, such a configuration may be adopted, which, based on a result of this determination, displays the support state displaying images including the vehicle images viewed from the viewpoints different between the driving support controls, which are activated in the situation where the driving load is relatively large, and the driving support controls, which are activated in the situation where the driving load is relatively small, the support state displaying images being different in display mode at the time when the control is operating.

For example, under a situation where the vehicle velocity Vd becomes the vehicle velocity threshold value or more, it becomes possible to display the support state displaying image with a display content to an extent where the driver can roughly recognize the operation situation, for example, which type of the driving support controls is operating, by the rapid movement of the line of sight and by the peripheral visual field. Meanwhile, under a situation where the vehicle velocity Vd becomes less than the vehicle velocity threshold value, it becomes possible to display the support state displaying image with a display content, for example, from which the driver can understand a more detailed operation situation of the driving support control by seeing the display content concerned.

This matter is applicable not only to the different driving support controls but also to the same driving support control. That is to say, even for the same driving support control, it is possible to change the content, which is to be displayed, to an appropriate content corresponding to a magnitude of the driving load depending on when the driving load is relatively large and relatively small.

(2) In the above-described embodiments, the driving support controls HSA and HDC are preset as the controls activated in the situation where the driving load is relatively small, and the driving support controls ATC, AEB, ARC and SMB are preset as the controls activated in the situation where the driving load is relatively large. Then, such a configuration is adopted, which displays the support state displaying images including the vehicle images viewed from the viewpoints different between the driving support controls, which are activated in the situation where the driving load is relatively large, and the driving support controls, which are activated in the situation where the driving load is relatively small, the support state displaying images being different in display mode at the time when the control is operating.

The present invention is not limited to this configuration. For example, based on a detection value of an inclination angle sensor (not shown) mounted on the automobile V, the display controller 30 detects a gradient of the travel road. Then, upon having determined that the detected gradient has a preset gradient threshold value or more, the display controller 30 determines that the driving load is relatively large, and determines that the driving load is relatively small upon having determined that the detected gradient is less than the gradient threshold value. Then, such a configuration may be adopted, which, based on a result of this determination, displays the support state displaying images including the vehicle images viewed from the viewpoints different between the driving support controls, which are activated in the situation where the driving load is relatively large, and the driving support controls, which are activated in the situation where the driving load is relatively small, the support state displaying images being different in display mode at the time when the control is operating.

For example, under a situation where the gradient of the travel road becomes the gradient threshold value or more, it becomes possible to display the support state displaying image with a display content to an extent where the driver can roughly recognize the operation situation, for example, which type of the driving support controls is operating, by the rapid movement of the line of sight and by the peripheral visual field. Meanwhile, under a situation where the gradient of the travel road becomes less than the gradient threshold value, it becomes possible to display the support state displaying image with a display content, for example, from which the driver can understand a more detailed operation situation of the driving support control by seeing the display content concerned.

This matter is applicable not only to the different driving support controls but also to the same driving support control. That is to say, even for the same driving support control, it is possible to change the content, which is to be displayed, to an appropriate content corresponding to a magnitude of the driving load depending on when the driving load is relatively large and relatively small.

Moreover, the above-described embodiments are preferred specific examples of the present invention, and variety of technically preferable limitations is imposed thereon; however, the scope of the present invention is not limited to these embodiments, unless it is particularly described that the embodiments impose limitations on the present invention. Furthermore, for convenience of illustration, the drawings for use in the above description are schematic views in which aspect scales of members and portions are different from actual ones.

Moreover, the present invention is not limited to the above-described embodiments, and modifications, improvements, equivalents and the like within the scope where the object of the present invention can be achieved are incorporated in the present invention.

Here, the present invention has been described while referring to the limited number of embodiments; however, the scope of rights is not limited to these, and modifications of the respective embodiments, which are based on the above-described disclosure, are self-obvious for those skilled in the art.

The invention claimed is:

1. A display control device for a vehicle, configured to perform a display control for a display device provided in a meter panel of an automotive meter device, the display control device comprising:
   an operation state determination unit configured to detect an operation state of a respective driving support control implemented by a driving support device;
   a steering angle sensor configured to detect a steering angle of the vehicle;
   the driving support device configured to activate a driving support control, the driving support control configured to be activated while the vehicle is traveling along a road that is a curved road and to control braking/driving force of respective wheels of the vehicle, wherein the road is determined to be curved based on the steering angle; and
   a display controller configured to display a support state displaying image on the display device, the support state displaying image being an image of a vehicle image superimposed on a background image that is a planar image with a predetermined shape, wherein, upon having determined that the driving support control, is activated based on the operation state detected by the operation state determination unit, the display controller changes a shape of a portion of the background image to be displayed on the display device to a curve shape curved in a steering direction determined based on the steering angle.

2. The display control device for a vehicle according to claim 1,
wherein, based on the operation state detected by the operation state determination unit, while the driving support control activated while the vehicle is traveling along the curved road is operating, the display controller performs a display control to superimpose and display images with a wheel shape on wheel positions of the vehicle image in the support state displaying image and to display the images with the wheel shape by a color exerting a preset display effect of allowing the images with the wheel shape to look like emitting light.

3. A display control device for a vehicle, configured to perform a display control for a display device provided in a meter panel of an automotive meter device, the display control device comprising:
an operation state determination unit configured to detect an operation state of a respective driving support control implemented by a driving support device;
a steering angle sensor configured to detect a steering angle of the vehicle;
the driving support device configured to activate a driving support control, the driving support control configured to be activated while the vehicle is traveling along a road that is a curved road and to control braking/driving force of respective wheels of the vehicle, wherein the road is determined to be curved based on the steering angle; and
a display controller configured to display a support state displaying image on the display device, the support state displaying image being an image of a vehicle image superimposed on a background image that is a planar image with a predetermined shape,
wherein, upon having determined that the driving support control, is activated based on the operation state detected by the operation state determination unit, the display controller changes a shape of a portion of the background image to be displayed on the display device to a curve shape curved in a steering direction determined based on the steering angle.

4. The display control device for a vehicle according to claim 3, wherein, after the shape of the background image is changed to the halfpipe shape, with regard to a plurality of divided regions obtained by dividing an image portion within a distance range preset from the vehicle image in the background image into plural regions in the perpendicular direction, a display control to change a present display color of the plurality of divided regions sequentially to other preset colors from a divided region on a side near the vehicle image toward a divided region on a side far from the vehicle image is performed.

5. The display control device for a vehicle according to claim 1, wherein, upon having determined that the driving support control is activated based on the operation state detected by the operation state determination unit, the display controller performs a display control to change a display color of the portion of the background image within a distance range preset from a portion of the vehicle image in the support state displaying image to a preset display color.

6. The display control device for a vehicle according to claim 5, wherein the display controller changes a display color of the portion of the background image within a distance range preset from a portion of the vehicle image to a display color exerting a preset display effect of allowing the portion of the background image to look like emitting light.

7. The display control device for a vehicle according to claim 1, wherein the background image includes a mesh image, which is a mesh-like image, and a gradation image.

8. The display control device for a vehicle according to claim 1,
wherein the vehicle image is an image from a viewpoint of looking down the vehicle from an upper rear of the vehicle, and
the background image is an image with a shape, which is extended in a far and near direction while defining a vehicle longitudinal direction of the vehicle image as the far and near direction and has a wider width in a direction perpendicular to the far and near direction toward a near side and a narrower width in the perpendicular direction toward a far side.

9. A display control method for a vehicle, configured to perform a display control for a display device provided in a meter panel of an automotive meter device, the display control method comprising:
detecting, with a steering angle sensor, a steering angle;
determining a steering direction based on the steering angle;
displaying on the display device a support state displaying image, wherein the image comprises an image of a vehicle superimposed on a background image that is a planar image with a predetermined shape; and
in response to a driving support control detecting based on the steering direction that the vehicle is traveling along a curved road, performing a display control to change a shape of a portion of the background image to a curve shape that is curved in the steering direction.

10. A display control method for a vehicle, configured to perform a display control for a display device provided in a meter panel of an automotive meter device, the display control method comprising:
detecting, with a steering angle sensor, a steering direction;
displaying on the display device a support state displaying image, wherein the image comprises an image of a vehicle superimposed on a background image that is a planar image with a predetermined shape; and
in response to a driving support control detecting based on the steering direction that the vehicle is traveling on a straight road, performing a display control to change a shape of the background image to a halfpipe shape in which both ends of the background image in a direction perpendicular to a far and near direction of the background image are lifted up to form walls surrounding crosswise side surfaces of the vehicle image.

* * * * *